United States Patent
Kobayashi et al.

(10) Patent No.: US 6,488,586 B1
(45) Date of Patent: Dec. 3, 2002

(54) RECORDING MEDIUM AND ENTERTAINMENT SYSTEM

(75) Inventors: Kazuhiro Kobayashi, Tokyo (JP); Noriyuki Watanabe, Tokyo (JP)

(73) Assignee: Sony Computer Entertainment Inc.

( * ) Notice: Subject to any disclaimer, the term of this patent is extended or adjusted under 35 U.S.C. 154(b) by 0 days.

(21) Appl. No.: 09/292,414

(22) Filed: Apr. 15, 1999

(30) Foreign Application Priority Data

Apr. 16, 1998 (JP) .......................................... 10-106596

(51) Int. Cl.⁷ ................................................ A63F 13/00
(52) U.S. Cl. ................................ 463/43; 463/8; 463/30
(58) Field of Search ........................... 463/43, 7, 8, 30, 463/31, 36, 37, 38, 39, 44, 45; 273/148 B

(56) References Cited

U.S. PATENT DOCUMENTS

| | | | | |
|---|---|---|---|---|
| 5,259,626 A | * | 11/1993 | Ho .......................... | 273/148 B |
| 5,317,505 A | * | 5/1994 | Karabed et al. ......... | 273/148 B |
| 5,390,937 A | | 2/1995 | Sakaguchi et al. ............ | 463/44 |
| 5,649,861 A | | 7/1997 | Okano et al. ................. | 463/30 |
| 5,649,862 A | | 7/1997 | Sakaguchi et al. ............ | 463/44 |
| 5,759,100 A | * | 6/1998 | Nakanshi ..................... | 463/37 |
| 5,769,719 A | * | 6/1998 | Hsu ............................. | 463/37 |
| 5,807,174 A | | 9/1998 | Fukuhara et al. ............. | 463/31 |
| 6,149,523 A | * | 11/2000 | Yamada et al. ............... | 463/31 |

FOREIGN PATENT DOCUMENTS

JP        5-228259        9/1993

OTHER PUBLICATIONS

Robert Brady "DOOM" Totally Unauthorized Tips and Secrets Brady Games See All Pages, Dec. 1994.
Nobunaga No Yabou Bushou Fuuunroku handbook, (Japan) K.K Kouei.

* cited by examiner

*Primary Examiner*—Valencia Martin-Wallace
*Assistant Examiner*—John M Hotaling, II
(74) *Attorney, Agent, or Firm*—Katten Muchin Zavis Rosenman

(57) ABSTRACT

An entertainment system includes an application program recording system which record an application program which can input at least one command of operation on which the player sets the action of the character on a display screen. The command is stored in an action set frame in the unit of one operation to action set frame used to create the movements of the player character. The system further has an input, operation system where the player inputs instructions and a control system which controls the operation of the player character on the display screen based on the command from the application program recorded by the application program record system and the input operation system.

8 Claims, 22 Drawing Sheets

RECORDING MEDIUM AND ENTERTAINMENT SYSTEM

BACKGROUND OF THE INVENTION

1. Field of the Invention

The present invention relates to a recording medium in which a program for a game where actions of a player character in a virtual world is simulated by the key input of the player is recorded, and an entertainment system using the program that has been read from the recording medium.

2. Description of the Prior Art

Role-playing games have become popular where the player performed a fixed role in the virtual world, and in most cases advanced towards an assigned goal while experiencing realistic adventures. In such role-playing games, the player controls the actions of the character by key input operation, and the action of the character can be simulated.

In the aforementioned role-playing games, since only a single command describing the behaviour of the character could be set in one operation, it was not possible to program consecutive movement of a character. This has resulted in game content that was poor in imparting a feeling of player's presence in the game scene. Moreover, the game content left players dissatisfied due to the simplicity of operations and the inability to carry out highly developed operations commensurate with the progress of the game.

Taking the above mentioned facts into consideration, the present invention allows the character to execute consecutive movements and offers an entertainment system which uses the program recorded in its recording medium to simulate realistic actions.

SUMMARY OF THE INVENTION

To solve the above mentioned problem, the recording medium related to the present invention stores the program which advances the game by recording key input of the player that makes a fixed character in the display screen act according to the intention of the player. In order to store the action of the above-mentioned fixed character within one action frame of the above-mentioned display, a program capable of storing at least one command related to the action of the above mentioned fixed character, is stored in the recording medium.

Here, the total allowed score for the actions in that action set frame and the corresponding action points for each type of the commands are set up beforehand, and if the action point total is within the permissible action points for the action set frame, the stored program is designed to input two or more of above mentioned commands.

In addition, when two or more of said commands in a said action set frame corresponds to a predefined pattern, the stored program converts the said multiple commands to a special command.

Moreover, in order to solve the above mentioned problem, the entertainment system of the present invention, where a player simulates the movements of the player character in the virtual world through the manipulation of key input, comprises an input device for a player command input operation, a storage medium which records a program capable of receiving at least one of the commands in one operation step for the action set frame that is used to set up the action of the player character, and a control device to control the movement of the player character on the display screen based on the command input through the input device as well as the program stored in the storage medium.

Here, the program is read from the recording medium where the said program is recorded into the said storage medium. Moreover, the program can be accessed and stored in the storage medium through communication means.

Moreover, the control means enables to record two or more of the action commands when the action command points are within the total action points allowed within the action set frame where the action points corresponding to each action command and the total allowed action points in said action set frame is assigned beforehand.

Moreover, when the order of two or more of said commands in the acting set frame corresponds to a predefined pattern, the control device converts the two or more of said commands into a special command.

Thus, as the present invention makes it possible to input commands with different lengths as long as the length of the action set frame is not exceeded, compound commands to carry out continuous action of the character can be generated.

DETAILED DESCRIPTION OF THE PREFERRED EMBODIMENTS

Embodiments of the recording medium and entertainment system according to the present invention are explained as follows, referring to the accompanying drawings.

This exemplifies a role-playing game device based on the application program recorded in the recording medium according to the present invention, where the player advances in the game by manipulating a character in the virtual world (player character) according to the instructions given.

Figure 1:
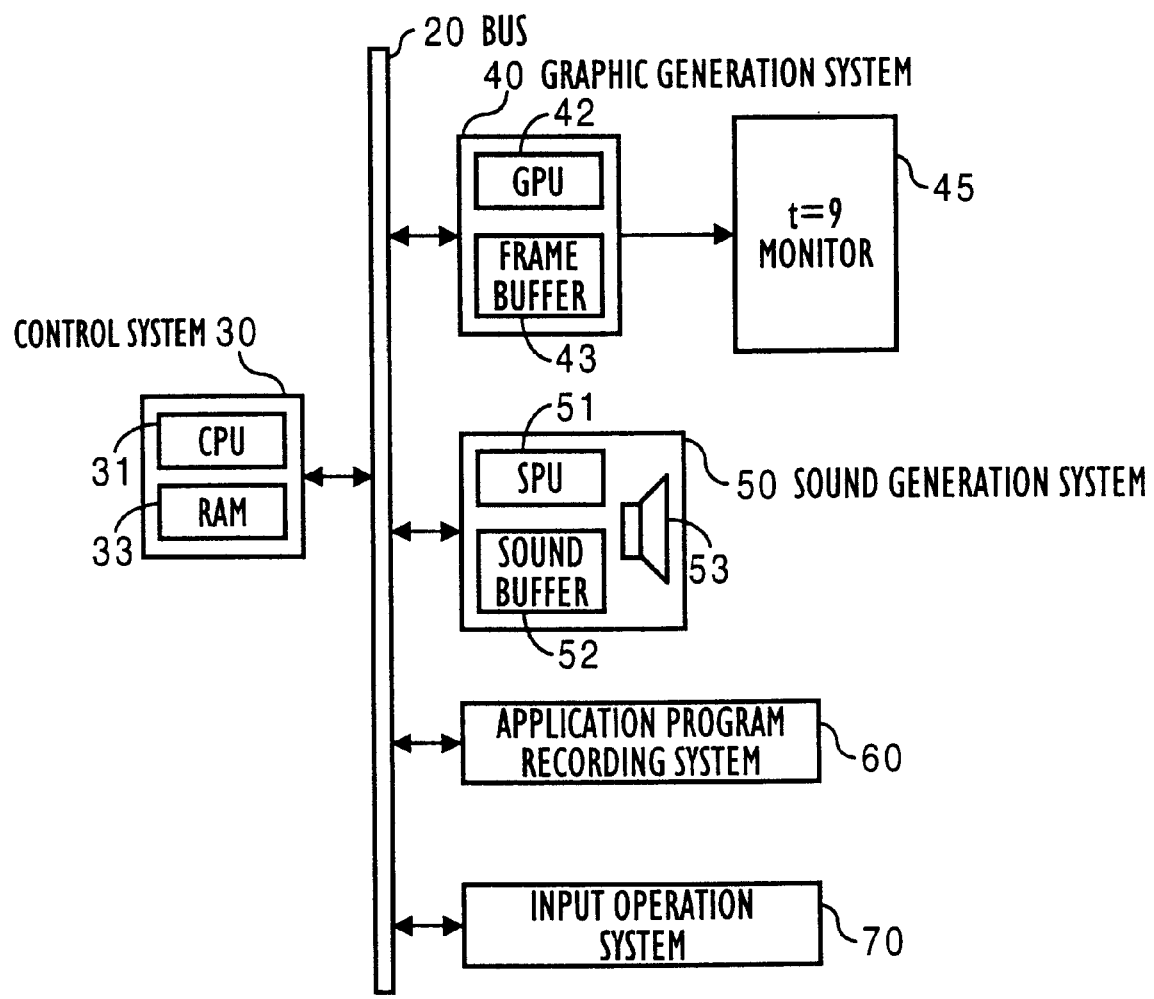
FIG. 1 is a circuit diagram of the role-playing game device by which the player simulates the actions of the character (player character) on the virtual world according to an application program recorded in the recording medium of the present invention.

As shown in FIG. 1, the role-playing device 10 connects a graphic generation system 40, a sound generation system 50, an application program recorded system 60 and an input operation system 70 to a control system 30 through a system bus (BUS) 20.

Control system 30 consists at least of a Central Processing Unit (CPU) 31, and RAM 33 which becomes the main memory. The main memory can at least execute the application program therein.

Graphic generation system 40 has at least an Graphic Processing Unit (GPU) 42 which draws according to the drawing command from CPU 31 and a frame buffer 43 where the image drawn by GPU 42 is stored. An image generated by the graphic generation system 40 is displayed on a monitor 45.

Sound generation system 50 consists of a Sound Processing Unit (SPU) 51, which generates the tone, sound effect, etc., based on the command from CPU 31, a sound buffer 52, which stores the tone, sound effects, etc., generated by the SPU 51, and a speaker 53 which outputs (pronounce) the tone, sound effects, etc., generated by SPU 51.

Application program record system 60 is an example of the recording medium of the present invention, where an application program for manipulating the behaviour of the player character in the virtual world according to the intentions of the player is recorded. Specifically, the recorded application program advances the game while changing the story and the action by making the player create a skill for the player character through key input operation for a situation, for instance, in an ensuing fighting with the enemy character encountered while the character is walking, for instance, in a forest, a plain, or a town.

Input operating system 70 is an input device through which the player inputs instructions, and it consists of a control lever and a group of push buttons. In general, it is called the controller in the field of game devices.

When the role-playing game device 10 is started by the player through the controller, CPU 31 of control system 30 reads the application program from the application program record system 60 through system bus 20, stores it in RAM 33, and begins execution.

When the execution of the application program is commenced, graphic generation system 40 generates video signals of the background of this game, the player character, the enemy character, etc. This video signal is output to the monitor 45, and the images of the background and the player character, etc., are displayed on the display screen of the monitor 45.

Moreover, by the start of the execution of the application program, sound generation system 50 generates the tone and the sound effects, etc., and the sound is made from speaker 53.

When the player operates the control lever and the group of push-buttons of input operation system 70, the corresponding commands are input to CPU 31 through system bus 20. CPU 31 controls graphic generation system 40 as the player character moves on the display screen of monitor device 45 according to the manipulation of the player. In addition, CPU 31 controls sound generation system 50 and various sound effects, tones, etc., are made from speaker 53.

Figure 2:
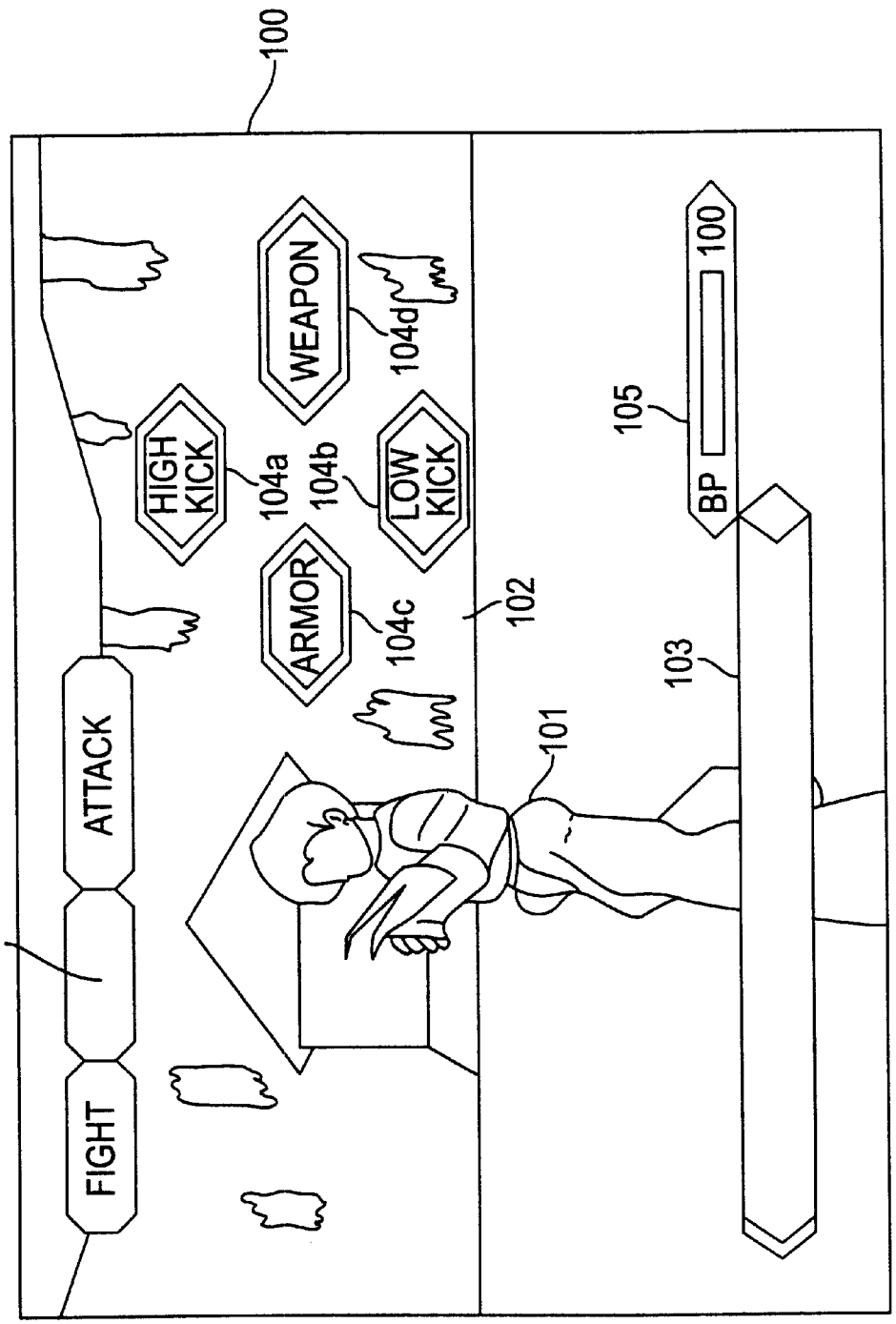
FIG. 2 shows a concrete example of a display screen which serves as the command set screen on the monitor device of the role-playing game device of FIG. 1.

A concrete example of a display screen on monitor device 45 is shown in FIG. 2. A command selection screen is shown in FIG. 2. In a display screen 100 which becomes the command selection screen, a player character 101 which becomes the simulation character that moves when the player manipulates the input operation system 70, a background image 102, an action gauge 103 which becomes the action set frame used to set up the actions of player character 101, command selection parts 104a, 104b, 104c and 104d which are indicating various attack commands selected by the player, are displayed. Furthermore, on display screen 100, an judgement gauge 105, for kill without fail technique which becomes the judgement criterion on whether the application of the kill without fail technique to be described later is permitted or not, is also displayed.

In the role-playing game device 10, the attack action of player character 101 against the enemy character cannot be defined with the player merely inputting only "Attack" command from the input operation system 70. Through input operation system 70, display screen 100 which becomes the command selection screen with command selection parts 104a, 104b, 104c and 104d displayed is selected, and by combining various commands and setting them up on action gauge 103 the attack action can be defined.

Here, various commands selected by command selection parts 104a, 104b, 104c and 104d have their own corresponding action points. Moreover, in action gauge 103, the total allowable action power allotted to player character 101 is decided and input of two or more various commands is acceptable if the total of the action points does not exceed the allowed total action power.

The length of action gauge 103 corresponds to the action power of player character 101. For instance, when "100" is given to player character 101 (hero 1) as an initial value, the length of action gauge 103 is represented by 100 dots. Moreover, when "120" is given as the initial value to the player character hero 2, although not shown in the figure, the length of action gauge 103 is made to be 120 dots. Furthermore, when "80" is given to the player character hero 3, also not shown in the figure, as the initial value, the length of action gauge 103 is set to 80 dots.

The action power which corresponds to the length of this action gauge 103 keep on rising as shown in the following Table 1 as the level of the player character advances with the progress of the game until it is made to stop when maximum value is reached, for instance at "288".

TABLE 1

| Level | Hero 1 | Hero 2 | Hero 3 |
|---|---|---|---|
| 1 | 100 | 120 | 80 |
| 2 | 106 | 128 | 85 |
| 3 | 112 | 136 | 90 |
| ↑↓↑↓↑↓ | ↑↓↑↓↑↓ | ↑↓↑↓↑↓ | ↑↓↑↓↑↓ |
| 48 | 274 | 288 | 280 |
| 49 | 288 | 288 | 285 |
| 50 | 288 | 288 | 288 |

Parameter, other than the above-mentioned action power can be assigned to the player character, for instance, three ascending type of parameters, namely; "Precocious type", "Immature type", and "Ordinary Type", and random error values, etc.

Moreover, the above-mentioned action power can be raised temporarily by using the "Yell" command during combat and by using special items, for instance, temporarily raised "Action Power"=normal "Action power" ×1.4+8. However, when the maximum value of 288 is exceeded, the values more than 288 are truncated.

Figure 3:
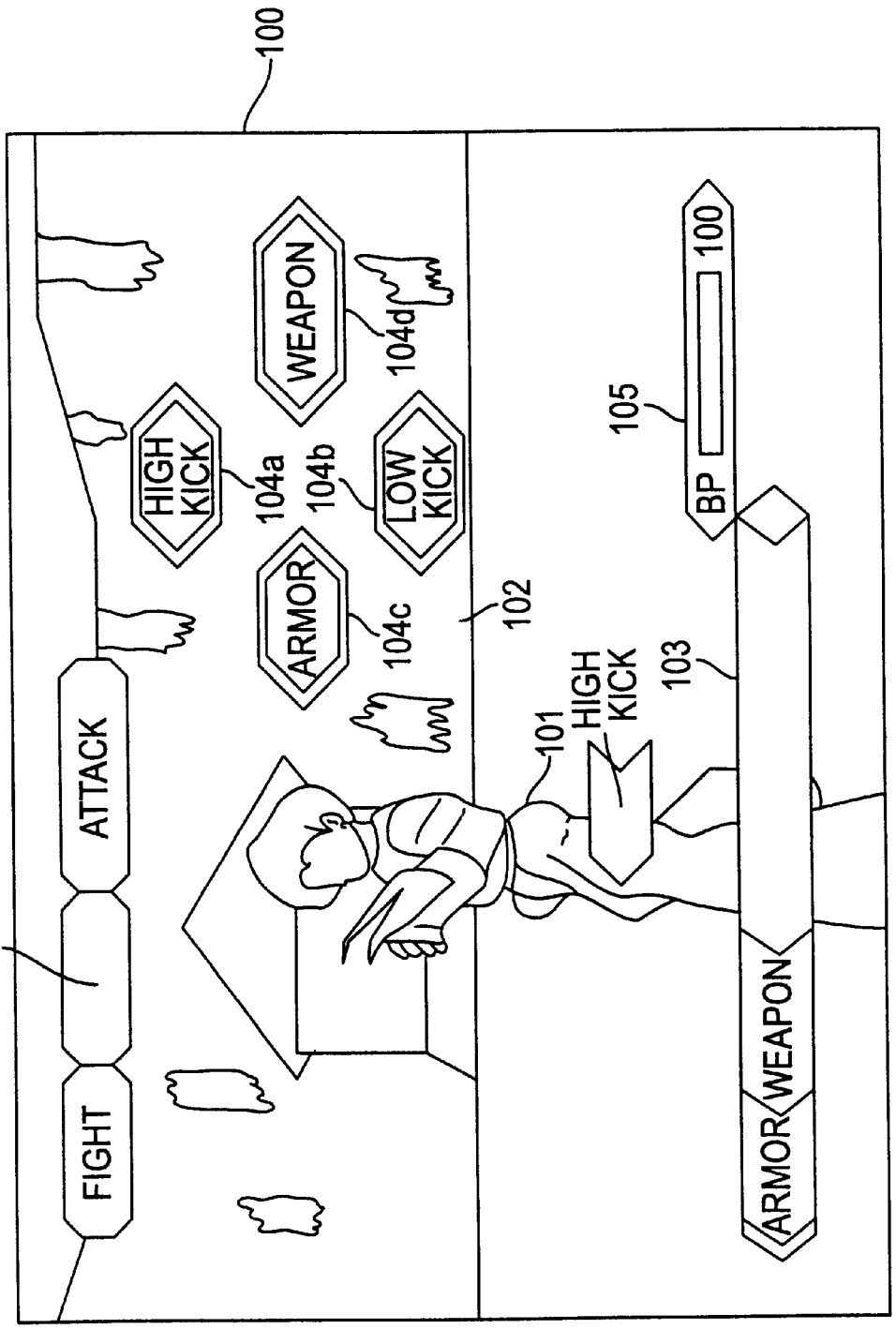
FIG. 3 is a set progress chart of the concrete example of the command set screen shown in FIG. 2.
Figure 4:
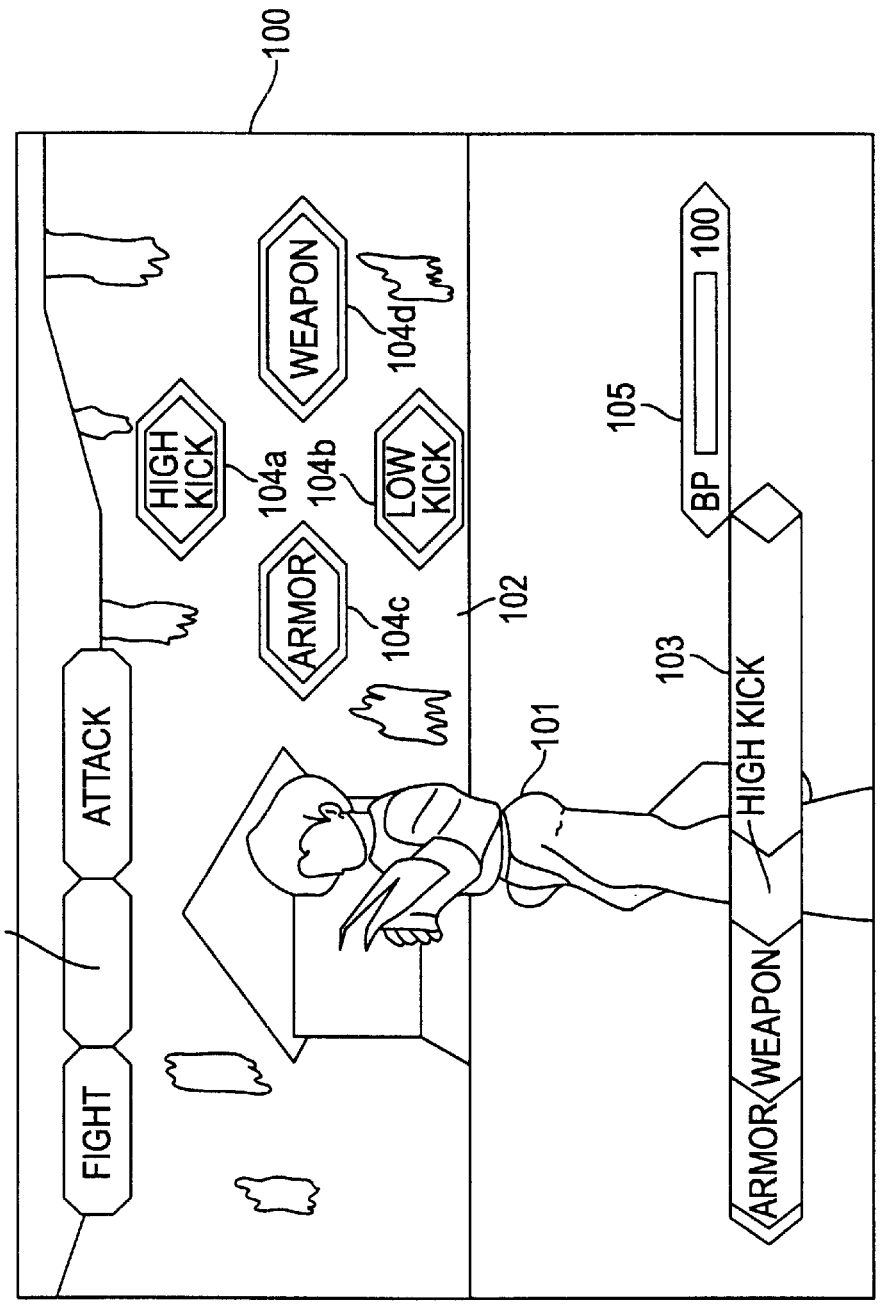
FIG. 4 is a set completion chart after the set progress chart shown in FIG. 3.

FIG. 3 and FIG. 4 show the process where the player sets up action power in this fashion on the action gauge 103, by setting up above-mentioned various commands through input operation system 70 using command selection part 104a, 104b, 104c and 104d.

The player uses input operation system 70 and selects the already selected command selection parts 104c and 104d and after setting up the "Armor" command and "Weapon" command in action gauge 103, selects further command selection part 104a and sets up "High Kick" command. Its progress is shown in FIG. 3. As shown in FIG. 4, finally the command "High Kick" is set up as well in action gauge 103.

Here "Armor" is a kind of weapon, and wearing it limits the techniques that can be used. As the action value, for example 25 is decided. For "High Kick" and "Low Kick" actions, each has an action point of 30, whereas 40, for example, is the action point for "Weapon".

As the total action point of this player character 101 is 95, which is below the initial value "100" of action gauge 103, setting up these commands is recognized. These commands are set up in the action pattern in RAM 33 list and the command input is terminated.

Figure 5:
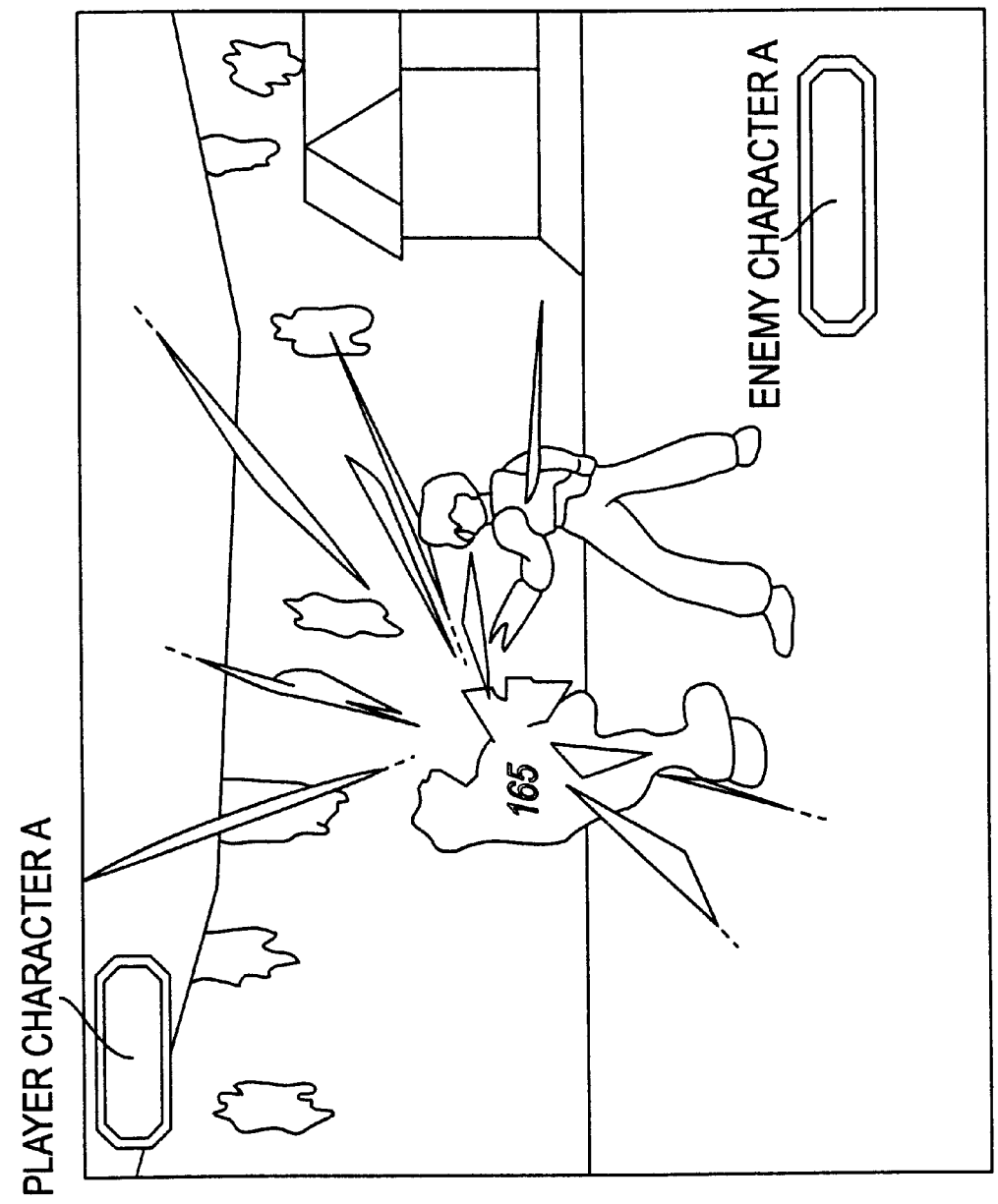
FIG. 5 shows a display screen which becomes a reproduction screen after the set completion chart shown in FIG. 4.
Figure 6:
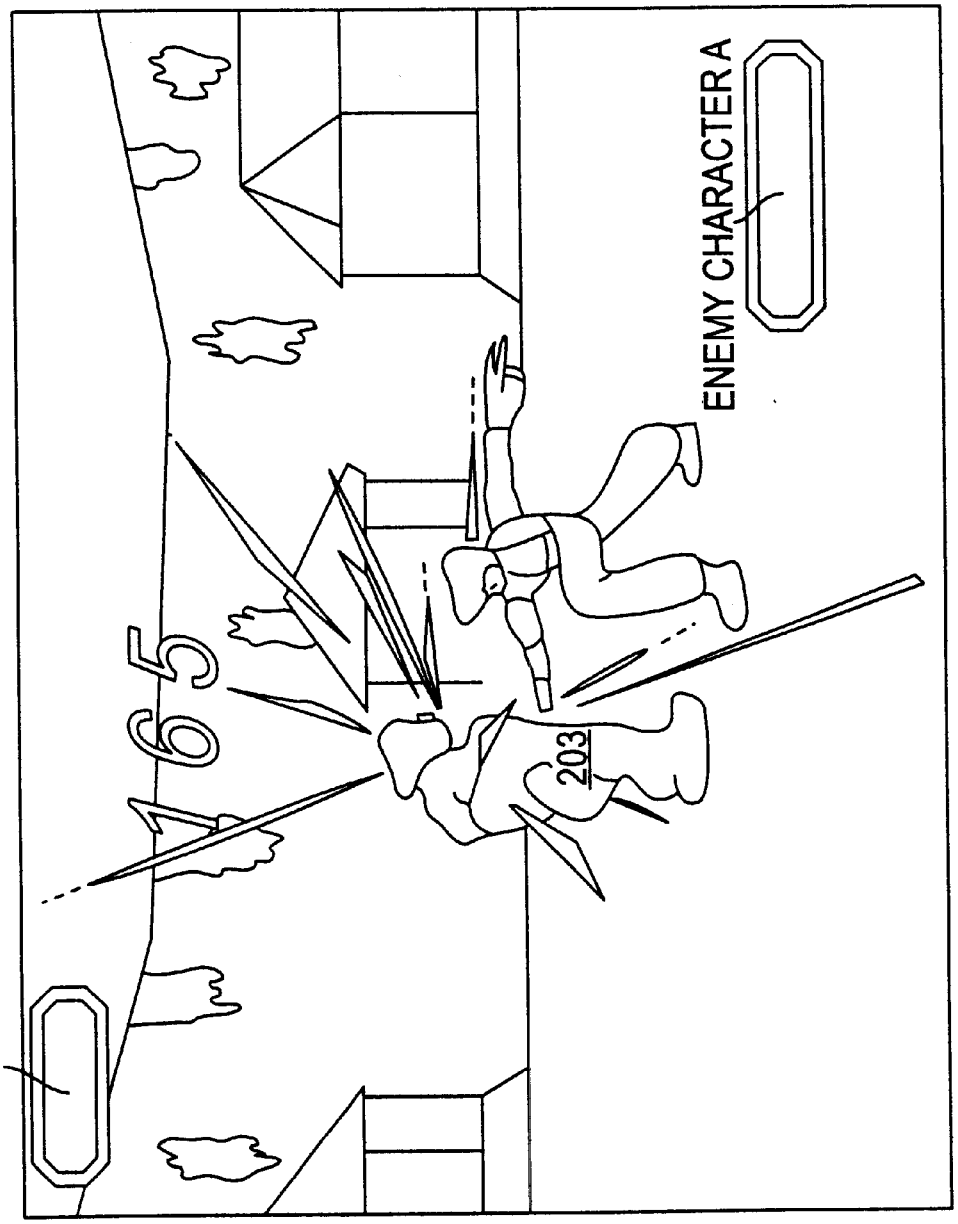
FIG. 6 shows another example of a display screen which becomes a reproduction screen after the set completion chart shown in FIG. 4.
Figure 7:
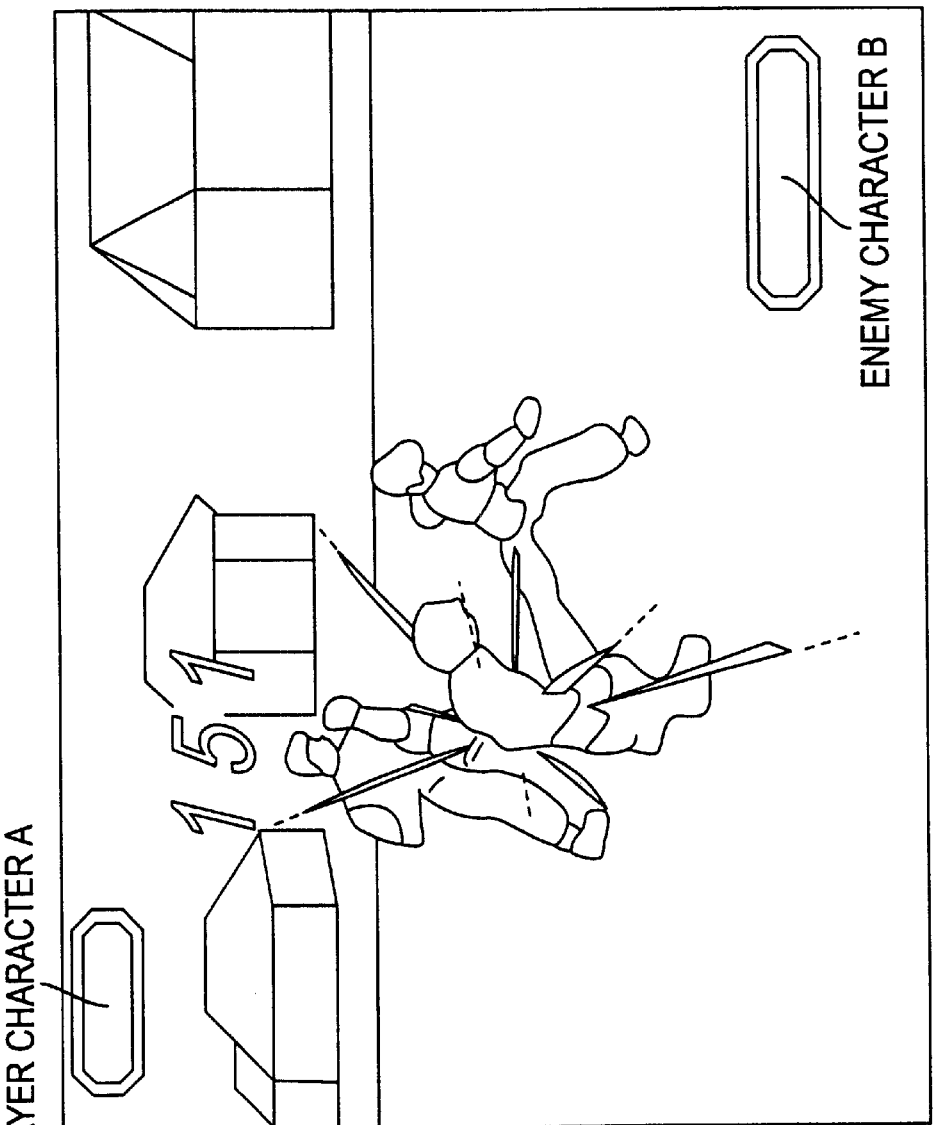
FIG. 7 shows another concrete example of a display screen which becomes a reproduction screen after the set completion chart shown in FIG. 4.

CPU 31 reads the said action pattern list in RAM 33, and makes the graphic generation system 40 to generate images corresponding to each of the said commands on action gauge 103. On the reproduction screen of monitor device 45 which becomes the display screen 100, the continuous techniques against enemy character A are shown as in FIG. 5, FIG. 6, and FIG. 7.

Moreover, in the role-playing game device 10, when a predefined condition is met by the arrangement of two or more of above-mentioned commands on action gauge 103 on display screen 100 which becomes a command selection screen shown in FIG. 2, an action different from a continuous action by each original command is carried out.

For instance, in the scene in which player character 101 fights against the enemy character, when the combination of the input commands forms a specific combination, the command changes into the kill without fail technique. The two kinds of this kill without fail technique are the "Combo technique" where only the last combination changes into a different technique and the "Special technique" command where all the combinations are changed.

Figure 8:
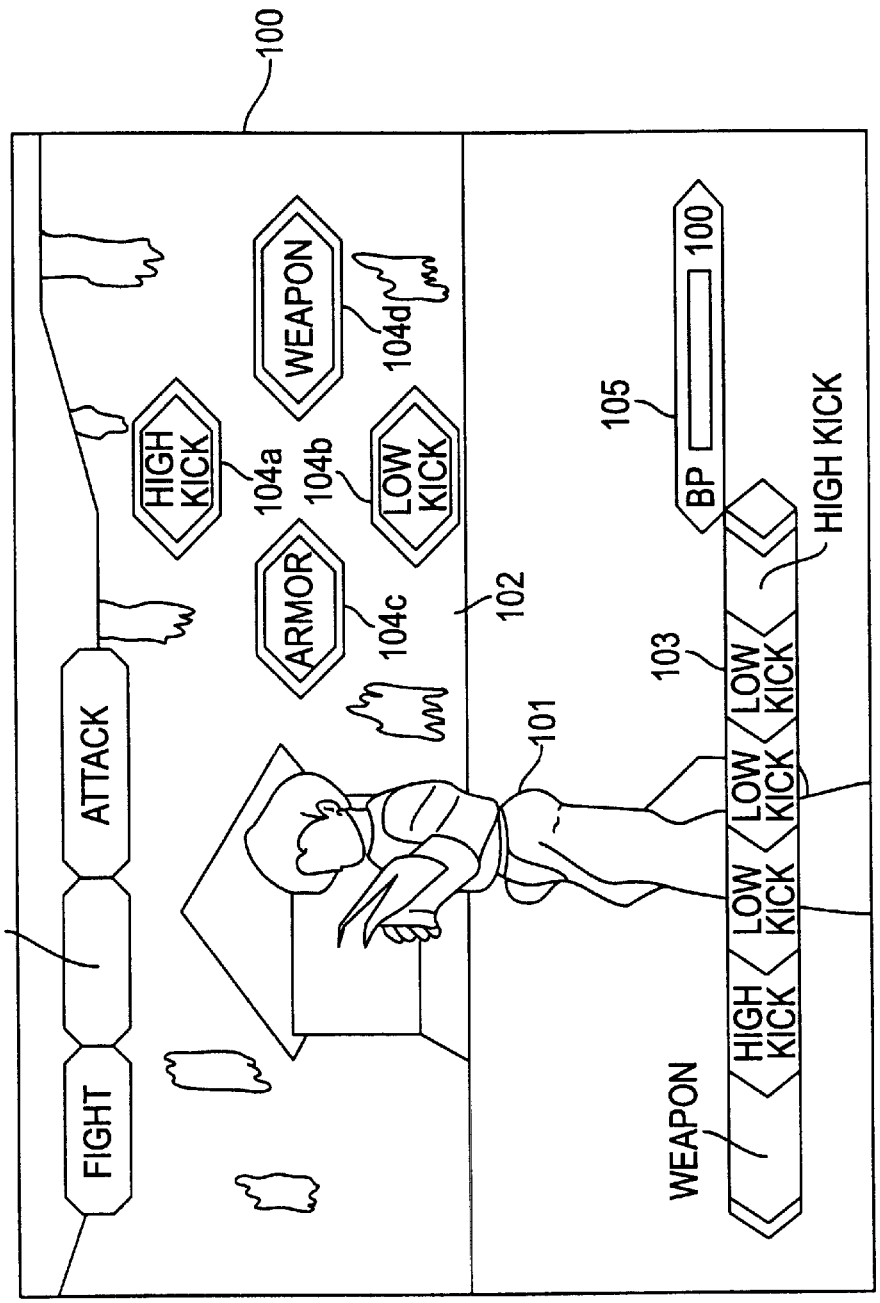
FIG. 8 shows a concrete example of a display screen as a command set screen for the role-playing game device on the monitor device, FIG. 8 being used especially to explain the creation of "Combo technique" in the kill without fail technique.

FIG. 8 shows a concrete example of the combination which becomes "Combo technique" in the kill without fail technique. As the player selects commands from selection part 104a, 104b, 104c and 104d on display screen 100 which becomes a command selection, it is assumed that the commands "Weapon", "High Kick", "Low Kick", "Low Kick", "Low Kick", "High Kick" are set in action gauge 103. The action power of action gauge 103 of player character 101 at this time is assumed to be increasing along with the rise of the level as shown in Table 1. Here, the combination of commands required to transform to "Combo Technique", which is decided beforehand, is when commands are arranged according to "Low Kick", "Low Kick" "Low Kick" and "High Kick".

If the total action value of the above mentioned combination of commands should meet the condition of being less than the action power of action gauge 103 then setting of the command is accepted and these commands are set in the above-mentioned action pattern list and the command input is terminated.

Figure 9:
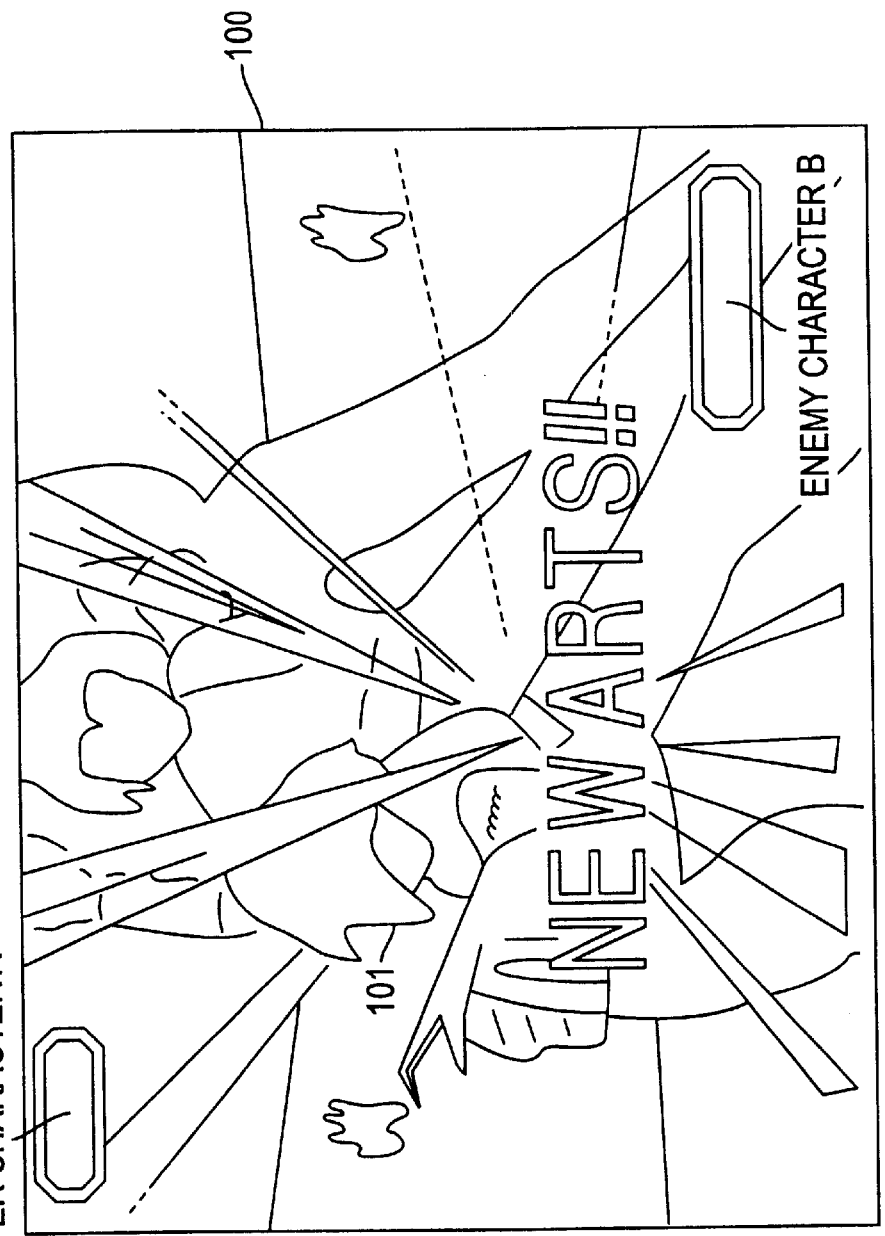
FIG. 9 shows the screen wherein the finding of altered "Combo technique" due to the setting made in the example of FIG. 8, is relayed to the player.
Figure 10:
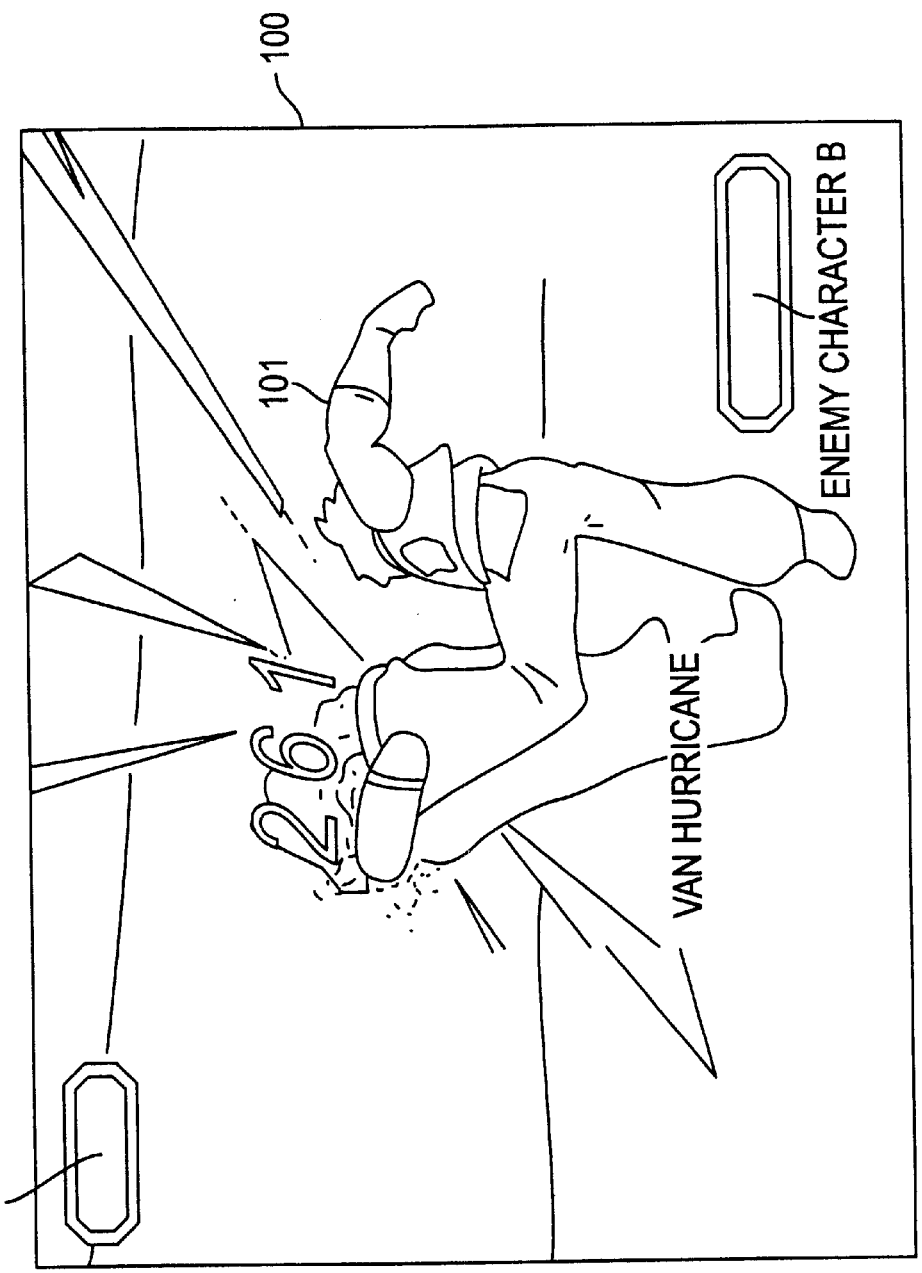
FIG. 10 shows the reproduction screen of the relayed "Combo technique" in FIG. 9.

Here, when CPU 31 of FIG. 1 judges that the arrangement of the commands input by the player is the same as in the above-mentioned combination decided beforehand, as shown in FIG. 9, by displaying "NEW ARTS!!" at the periphery of player character 101 on display screen 100 which becomes the reproduction screen of monitor device 45, finding a new technique is notified to the player. Next on display screen 100, the actions of player character 101 are the following: after "Low Kick", "Low Kick", "Low Kick" follows "High Kick". However, instead of "High Kick" other techniques can be used, for instance as shown in FIG. 10, a back kick called "Van Hurricane" may be added then followed by "Combo technique".

Figure 11:
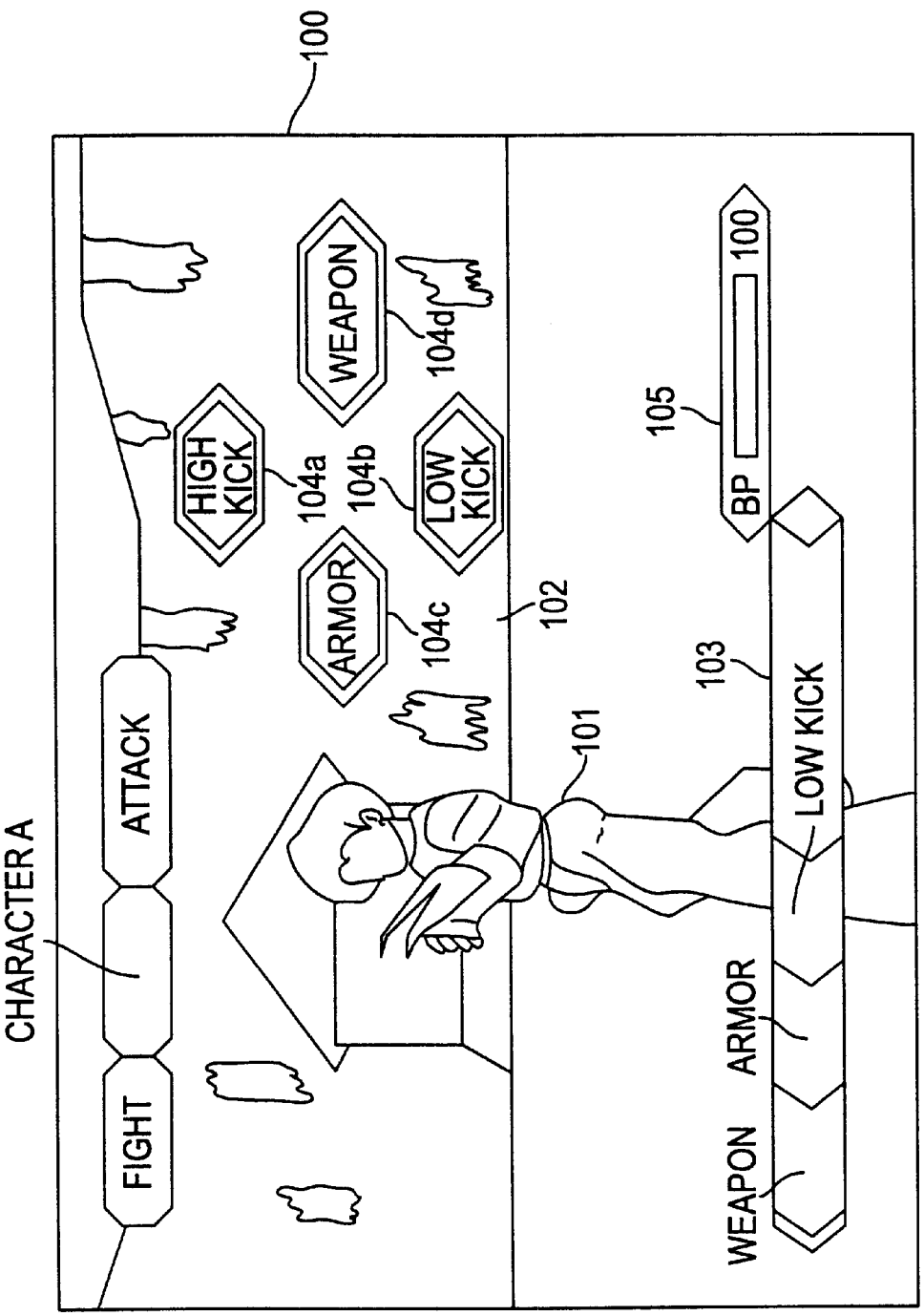
FIG. 11 shows an example of a display screen as a command set screen on the monitor device of the role-playing game device, FIG. 11 being especially used to explain the creation of "Special technique" in the kill without fail technique.

Next, a concrete example of the combination which becomes "Special technique" in the kill without fail technique is shown in FIG. 11. It is assumed that "Weapon" command, "Armor" command, and "Low Kick" command were set in action gauge 103 as the player selects commands by selection parts 104a, 104b, 104c and 104d on display screen 100 which becomes a command selection screen. In addition, at this time, the action power of action gauge 103 of player character 101 as shown in Table 1, increases with the rise of the level. Here, the combination of commands which becomes advance "Special technique" is decided at the time when the order of the commands are as follows: "Weapons", "Armor" and "Low Kick".

If setting the total of action values of the above mentioned combination of commands is admitted subjected to being less than the action power of action gauge 103, these commands are set in the above-mentioned action pattern list and the command input is terminated.

Figure 12:
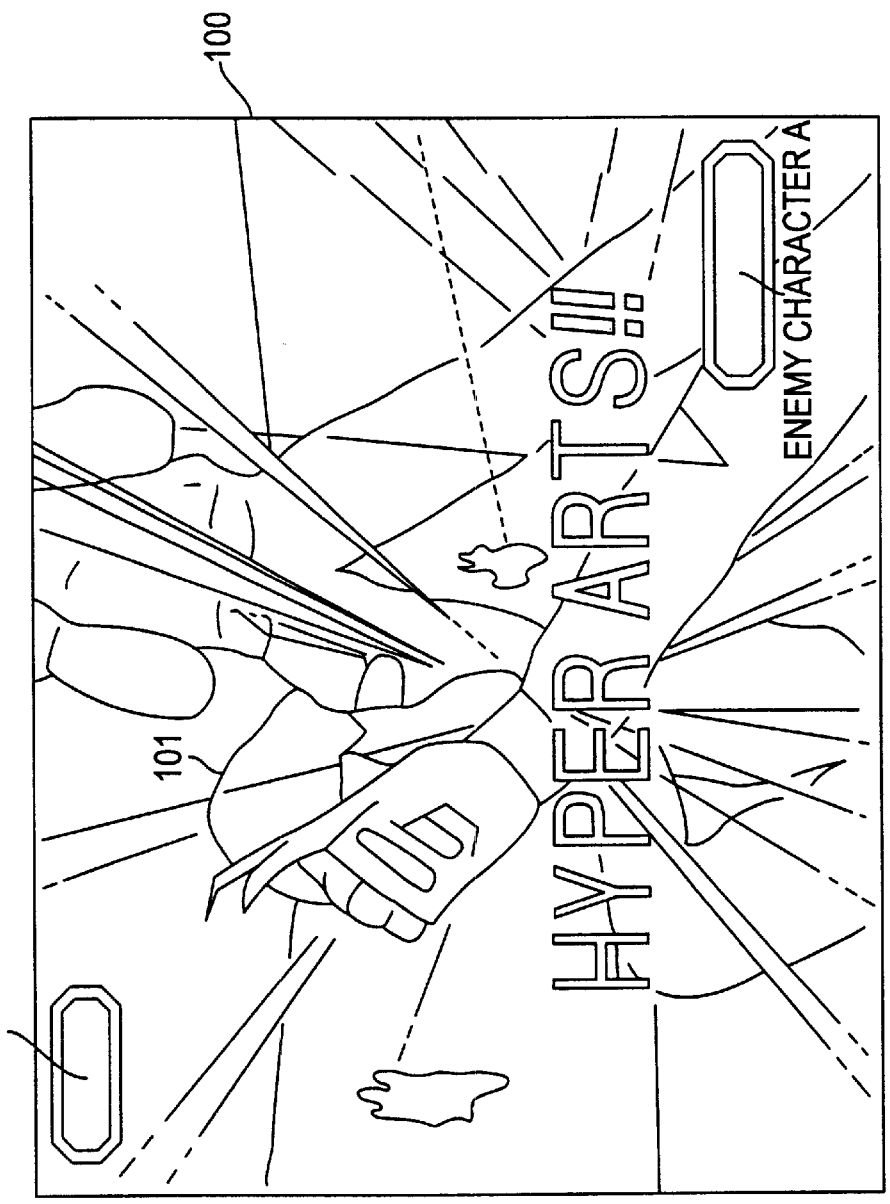
FIG. 12 shows the screen where finding of altered "Special technique" due to the setting made in FIG. 11 is relayed to the player.
Figure 13:
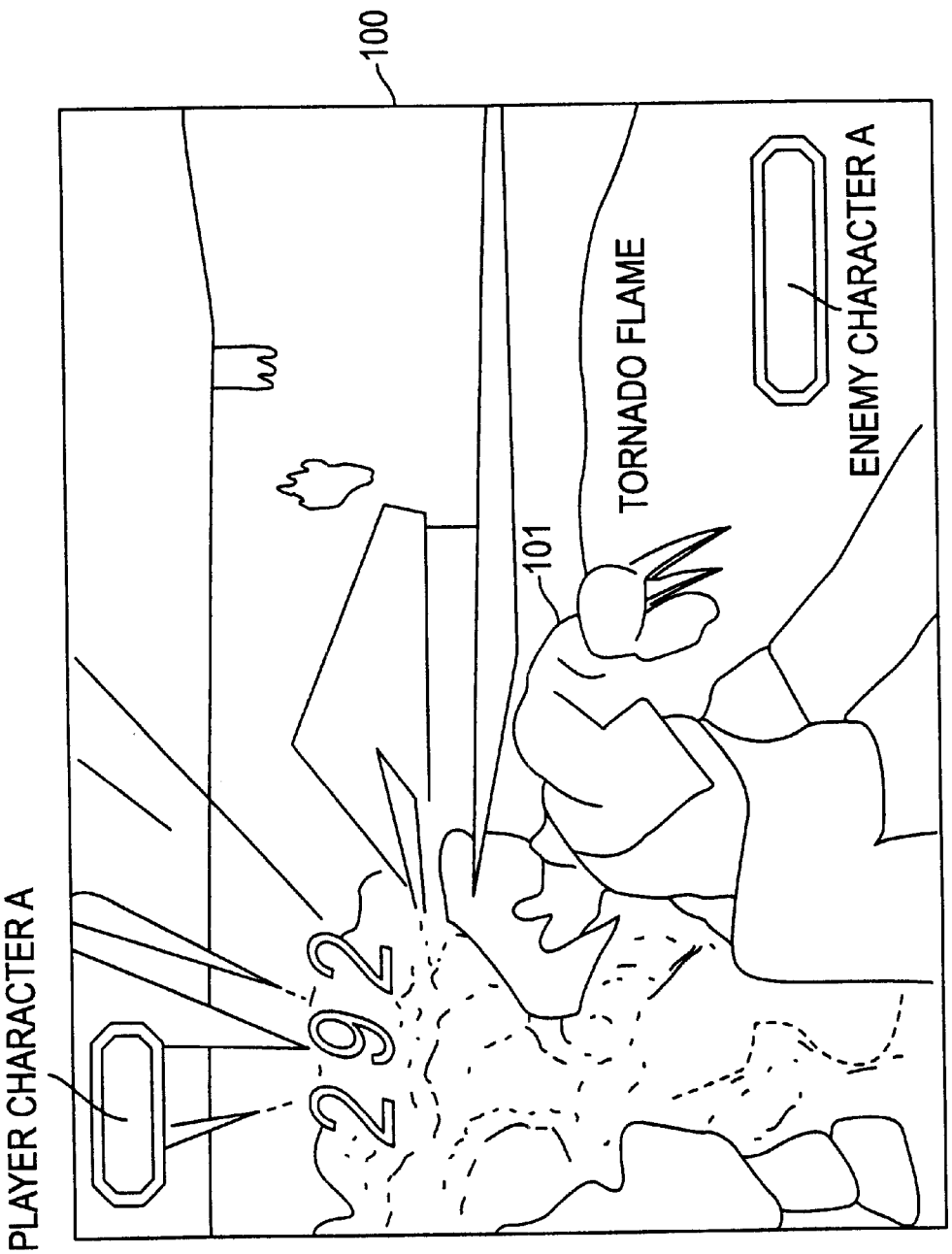
FIG. 13 shows an example of the reproduction screen for "Special technique" relayed in FIG. 12.
Figure 14:
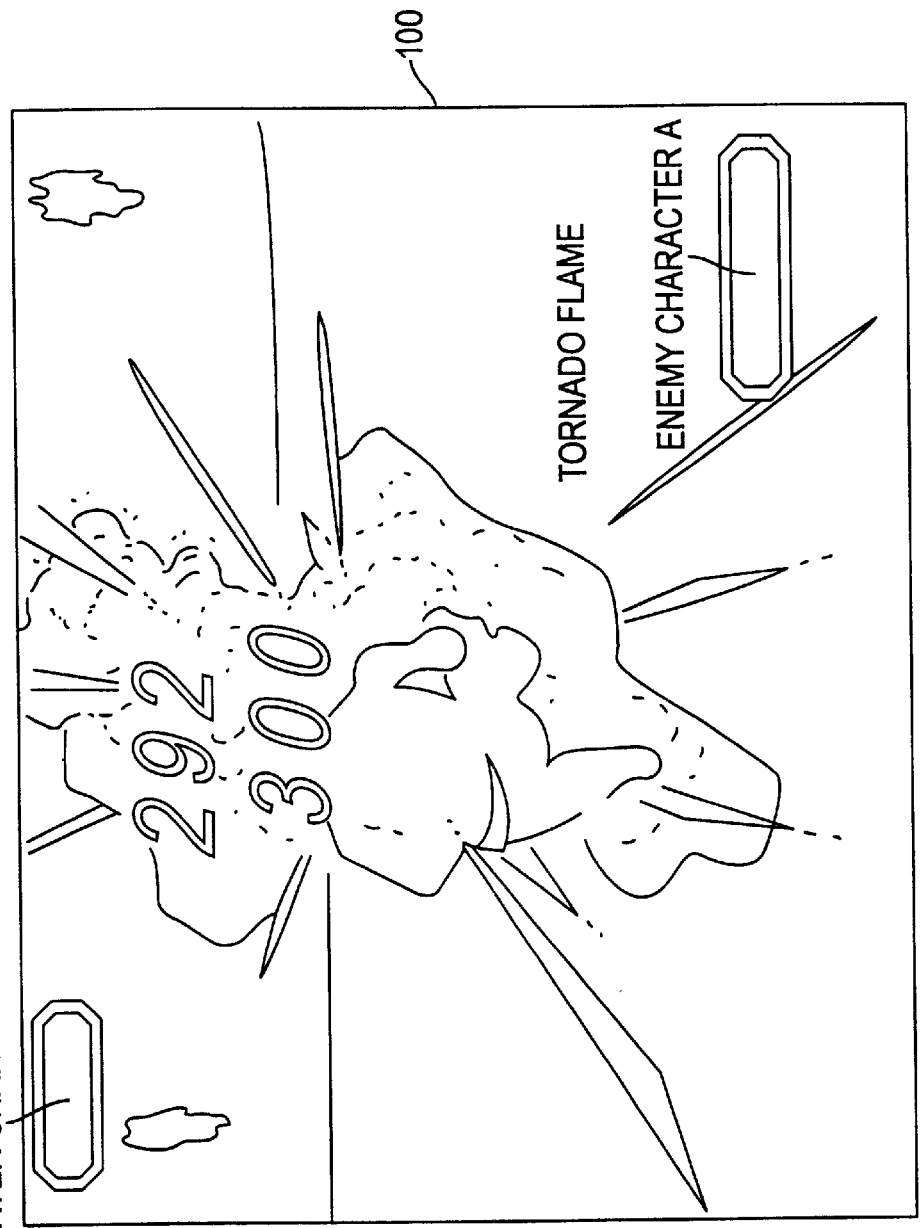
FIG. 14 shows another example of a reproduction screen for "Special technique" relayed in FIG. 12.

Here, when CPU 31 in FIG. 1 judged that the order of the command input by the player is the same as the above mentioned combination which is decided beforehand, finding a new technique is notified to the player by displaying "HYPER ARTS!!" near player character 101 on display screen 100 which becomes the reproduction screen of monitor device 45 as shown in FIG. 12. Then, the action of player character 101 on display screen 100 is changed to a quite new technique "Tornado Flame" as shown in FIG. 13 and FIG. 14.

Here, a specific combination is set individually for each character. However, even if a combination is included, it sometimes does not become a kill without fail technique depending on equipped arms and other conditions. Moreover, in the case where a combination of actions meet two or more conditions, priority is given to the combination which starts earlier. Moreover, if the starting commands are the same, then priority is given to the longer combination.

Figure 15:
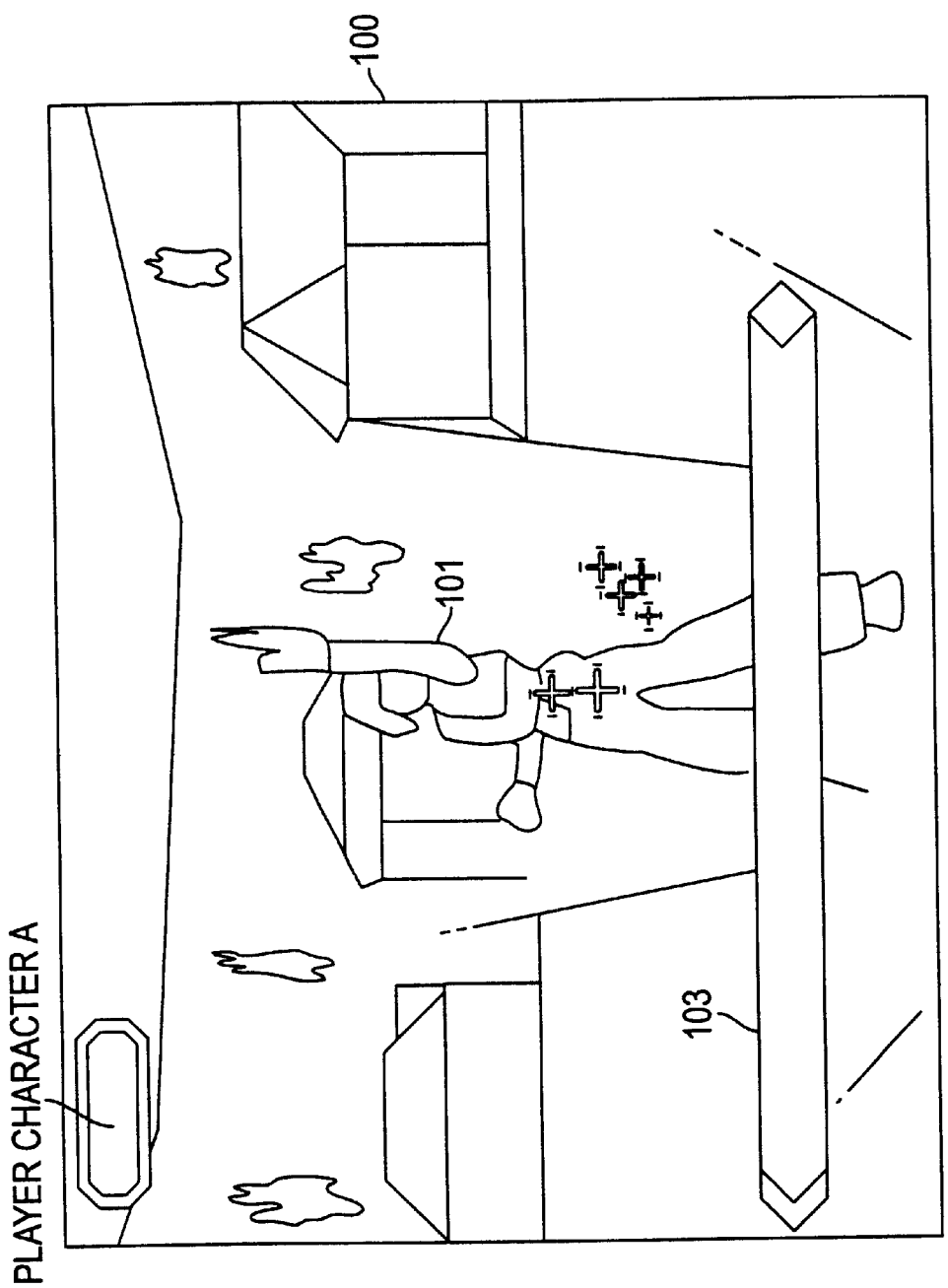
FIG. 15 shows a screen where the increase of the action gauge corresponding to the rise of the action power of the player character is indicated.

When the action power of player character 101 is raised, for instance, the elongation of action gauge 103 is shown in FIG. 15. As mentioned above, this is temporarily possible by the use of combating command "Yell", for example, and by the use of a special item. Moreover, as shown in above-mentioned Table 1, this is also possible when the level of the player character rises with the progress of the game.

Here, the game has been advanced by using player character 101 alone, but it is also possible to advance the game by using other player characters. Other than Player character 101 (player character 1) as "Hero 1", as shown in Table 2 using "Hero 2" as Player 2 and "Hero 3" as Player 3 to advance the game is also possible.

TABLE 2

| Command | Hero 1 | Hero 2 | Hero 3 |
|---|---|---|---|
| Long Sword | 30 | 54 | 42 |
| Hammer | 42 | 54 | 30 |
| Knife | 42 | 30 | 54 |

The action point of each command is made according to the compatibility of each player character with the type of equipment and arms as shown in Table 2. For instance, the character of a large boorish man can easily brandish the hammer, however it is difficult for him to brandish a small knife. On the other hand, the character of a diminutive girl has difficulty in brandishing the hammer, but she is able to attack by brandishing a small knife quickly.

Figure 16:
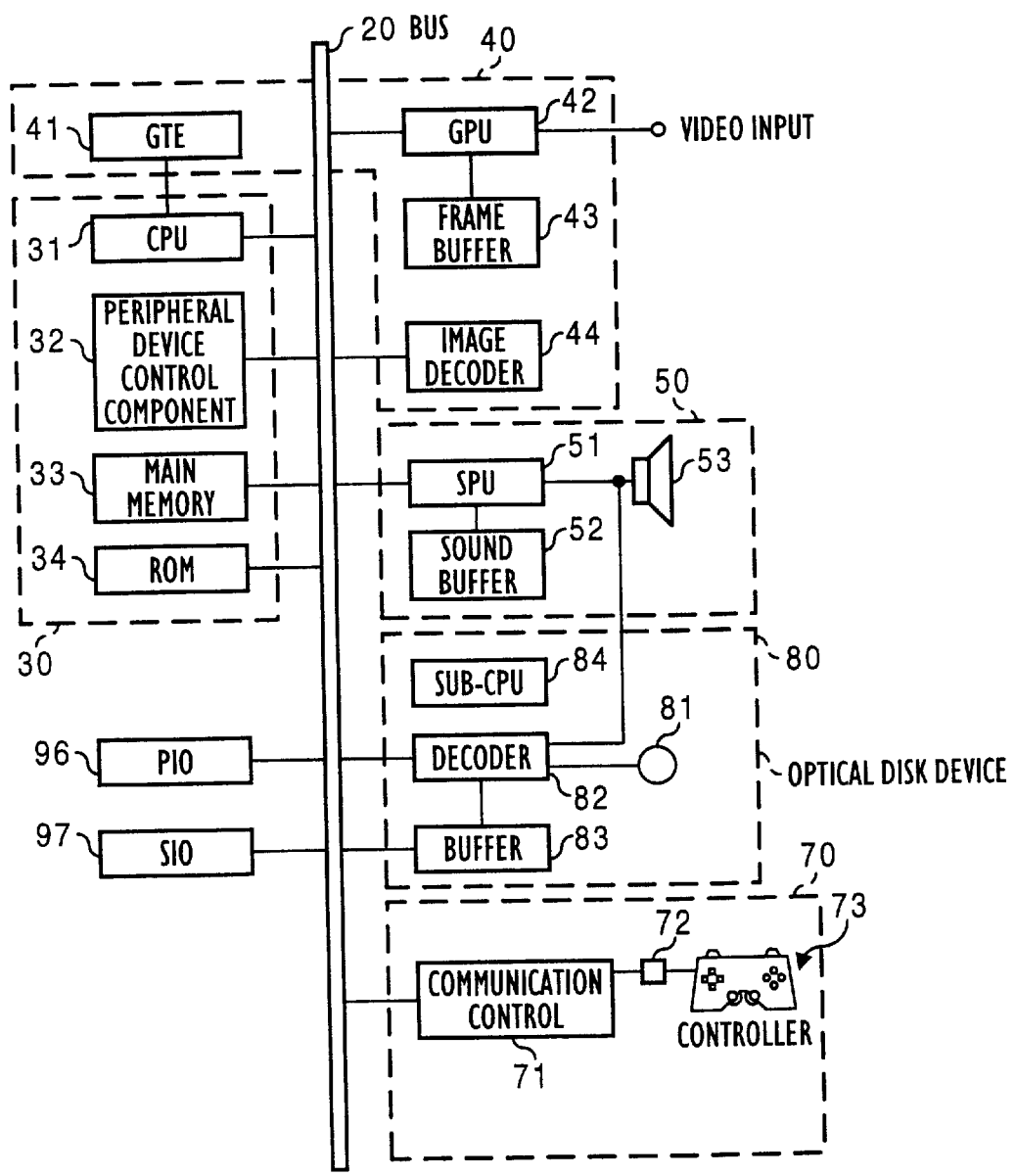
FIG. 16 is the circuit chart of the composition of the video game machine which serves as a role-playing device when CD-ROM, a kind of optic disk possible to install and use, is installed.

Next the application program recording system 70 as shown in FIG. 1, can be used with the possibility of installing optical disks such as CD-ROM and DVD into it. The composition of the video game device 1 which works as a role-playing game device with an optical disk installed is shown in FIG. 16.

Through system bus (BUS) 20, the video game device 1 is connected to control system 30, graphic generation system 40, sound generation system 50, optical disk control component 80 and input operation system 70. If the role-playing game software is not installed in an optical disk in the video game device it becomes a game device for other game software, the following points may become different.

As control system 30, besides CPU 31 and RAM 33 shown in FIG. 1 peripheral equipment control part 32 where the interruption control and direct memory access (DMA) forwarding are controlled, and a so-called operating system program where read-only memory ROM) 34 is stored to control main memory 33, graphic generation system 40, and sound generation system 50, etc., are provided.

This CPU 31, for instance, consisting of 32 bit-RISC-CPU, controls this whole video game device 1 by executing the operating system stored in ROM 34. The detailed composition and operation of this CPU 31 are described later.

For this video game device 1, as the power supply is turned on, the CPU 31 of control system 30 can execute the operation system stored in ROM 34 and CPU 31 can have the control of graphic generation system 40 and sound generation system 50, etc. Moreover, when the operation system is executed, CPU 31 controls optical disk control part 80 after initialization of the entire video game device 1 for operation readiness confirmation, etc., and executes the application program of the game, etc., which is recorded in the optical disk. By executing the program of this game, CPU 31 controls graphic generation system 40 and sound generation system 50, etc., in accordance to the input from the user, and through this, the generation of the display of the image, the sound effect, and the tone are controlled.

Moreover, other than GPU 42 which is similar to the one shown in FIG. 1 and frame buffer 43, graphic generation system 40 is provided with a Geometry Transfer Engine 41 where coordinates conversion is processed, and image decoder 44 which decodes image data compressed by orthogonal transformations such as discrete cosine conversion.

Above-mentioned GTE 41 provides the parallel operation mechanism which executes the multiple operations in parallel, and can carryout the operations of the coordinates conversion, the light source calculation, matrix or vector computations, etc., at high speed according to the operation demand from above-mentioned CPU 31. Concretely, this GTE 41 for instance, when carrying out flat shading for drawing a triangular polygon with the same color, come to being able to perform a maximum of about 1,500,000 coordinate operations of a polygon in one second. As a result, the load of CPU 31 is decreased, and high-speed coordinate operations can be carried out in this video game device.

Moreover, the above-mentioned GPU 42 draws polygons on frame buffer 43 according to the drawing instruction from CPU 31. This GPU42 can draw a maximum of about 360,000 polygons in one second.

In addition, above-mentioned frame buffer 43 consists of so-called dual port RAM, reading for display simultaneously with drawing from GPU 42 or transmission from the main memory.

For instance, this frame buffer 43 has the capacity of 1 MB, and is treated as a matrix consisting of 1024 pixels horizontally and 512 pixels vertically, each with a capacity of 16 bits. Moreover, as a video output, besides the display area, this frame buffer 43 is provided with CLUT area where Color Look Up Table which GPU 42 refers to when drawing polygons, is stored and texture area, where at the time of drawing coordinates are converted and the texture of materials to be inserted (mapping) into the drawing by means of GPU 42 is stored. According to the change in the display area, etc., these CLUT area and texture area are dynamically altered.

In addition, besides said flat shading, said GPU 42 can also perform Gouraud shading, in which the color in the polygon is interpolated from the color of the vertices of the polygon, and texture mapping, in which the texture stored in said texture area is pasted onto the polygon. When this Gouraud shading or texture mapping is performed, said GTE 41 can perform up to about 500,000 coordinate operations of a polygon per second.

Also, from the control said CPU 31, image decoder 44 decodes still pictures stored in main memory 33 or image data of moving pictures and then stores them in main memory 33.

Moreover, these reproduced image data can be stored in frame buffer 43 through GPU 42 and then can be used as a background of the image drawn by the above-mentioned GPU 42.

The above-mentioned sound generation system 50 consists of SPU 51 similar to the one shown in FIG. 1, sound buffer 52, and speaker 53.

Here, SPU 51 is provided with ADPCM decoding function to reproduce the voice data subjected to adaptive forecast encoding (ADPCM: Adaptive Differential PCM) which convert voice data in 16 bits to differential signals in 4 bits, reproduction function to generate the sound effect, etc., by reproducing the data in wave form stored in sound buffer 52, and modulation function, etc., to reproduce the modulated data in wave form stored in sound buffer 52.

With functions mentioned above provided, this sound generation system 50 can use the so called sampling sound source to generate the tone and the sound effect, etc., based on the wave data recorded in sound buffer 52 by the instruction from CPU 31.

Moreover, the above-mentioned optical disk control part 80 is provided with an optical disk device 81 to reproduce data, programs, etc., stored in the optical disk, a decoder 82 to decode data, programs, etc., added and stored for instance by error correction code (ECC: Error Correction Code), and a buffer 83 to speed up the reading of data from the optical disk by temporarily storing data from optical disk device 81. CPU 84 is connected to the above-mentioned decoder 82.

Moreover, as for the sound data being recorded in the optical disk and readable with optical disk device 81, besides the above-mentioned ADPCM there is so-called PCM data which are the analog/digital converted of sound signal.

The differential digital data of 16 bits shown, for instance, by four bits as ADPCM data and the recorded voice data are supplied to the said SPU 51 after they were decoded with decoder 82 and after carrying out the processing of digital/analog changes, etc., at SPU 51 they are used in order to operate speaker 53.

Moreover, the voice data recorded for instance as digital data in 16 bits are used as PCM data to operate speaker 53 after they are decoded with decoder 82.

Moreover, input operation system 70 is provided with communication control machine 71 which controls the communication with CPU 31 by bus BUS 20, and with controller connection part 72 where the input controller 73 which inputs the instruction from the user is connected to.

Controller 73 connected to the said controller connection part 72 possesses 16 instruction keys, for example, to input the instruction from the user, and transmits the state of this instruction key to communication control machine 71 about 60 times per second by synchronous communication according to the instruction from the communication control machine 71. Then the state of the instruction key of input controller 73 is transmitted to CPU 31 through communication control machine 71.

As a result, the instruction from the user is input to CPU 31, and based on the executed game program, etc., CPU 31 processes the instruction from user.

Figure 17:
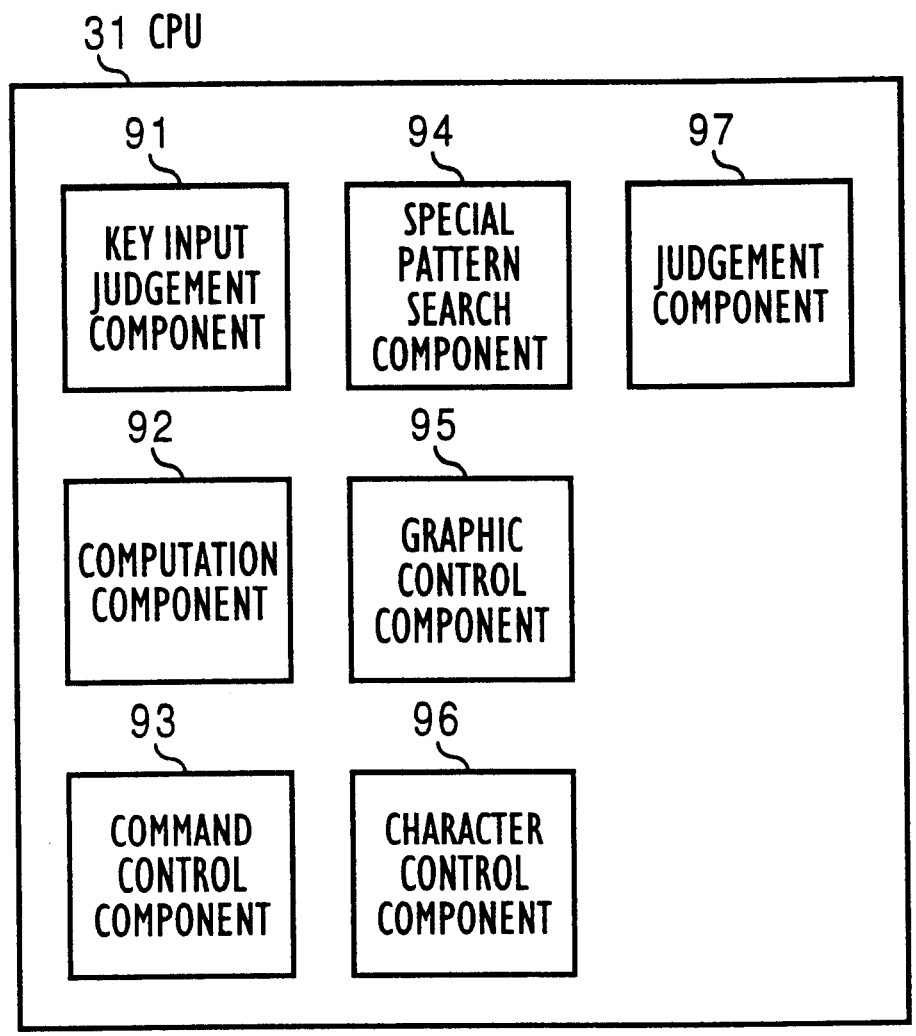
FIG. 17 is a function block chart that explains the functions of CPU in the above-mentioned FIG. 1 and in FIG. 16.

The function block chart of CPU 31 when it serves as an application program for the role-playing game as explained through the said FIGS. 2–15 wherein CD-ROM is installed in optical disk device 81 in optical disk control part 80 of this video game machine 1, is shown in FIG. 17. This function block chart also applies to CPU 31 shown in FIG. 1.

CPU 31 judges the key input of the player in key input judgement part 91 using input controller 73. Moreover, the action power of action gauge 103 and the total action value of each command are calculated by calculation part 92 while the command input by the player using command selection part 104a, 104b, 104c and 104d is controlled in command control part 93. In addition, whether a combination of commands set in action gauge 103 is a special pattern decided beforehand or not is decided in special pattern search part 94. Moreover, the reproduction image generation with graphic generation part 40 is controlled in graphic control part 95. In addition, player characters 1, 2, 3, and the enemy character are controlled in character control part 96. Finally, the control and management which uses each of the said part 91–96 are judged in judgement part 97.

Figure 18:
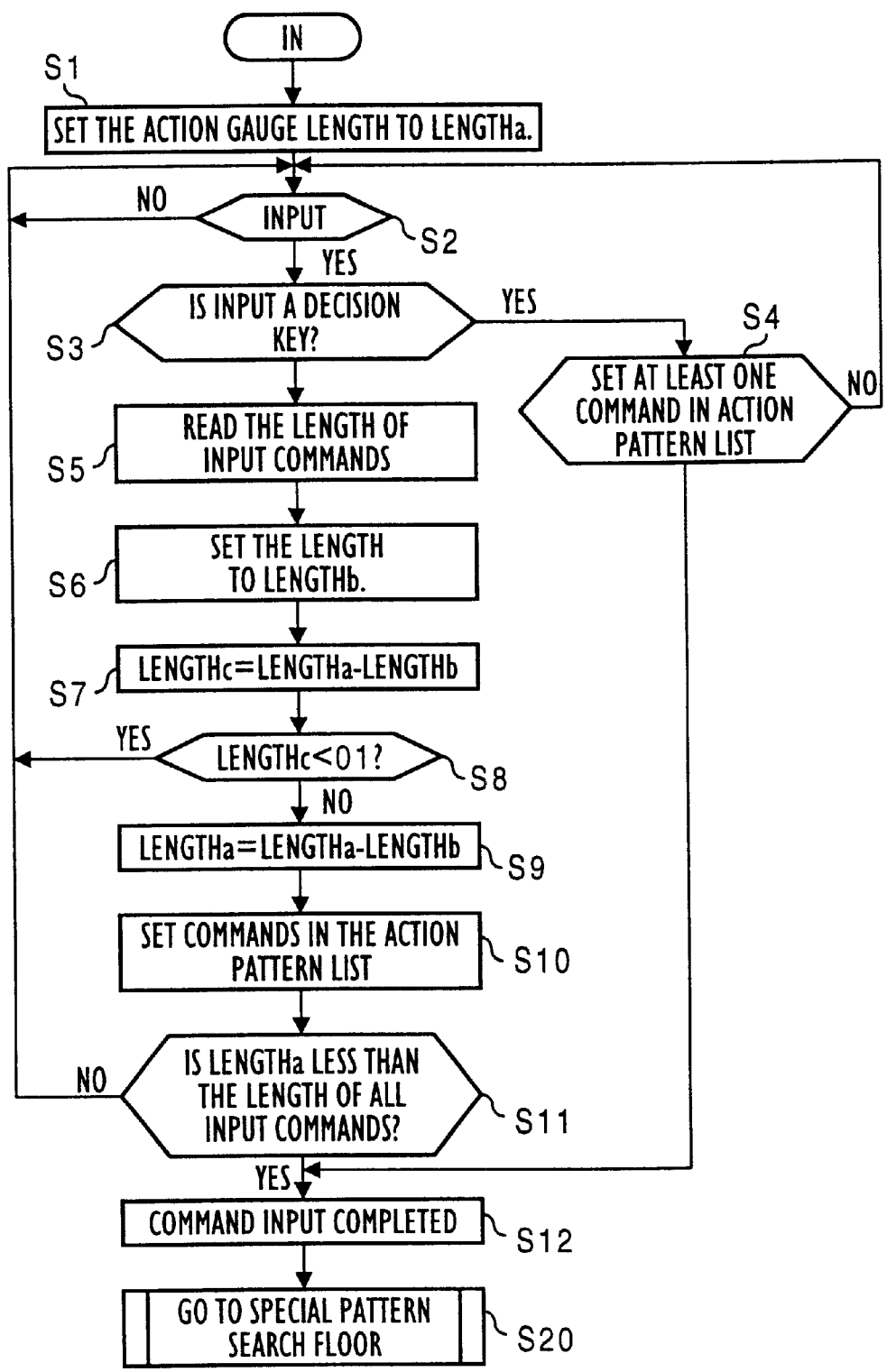
FIG. 18 is a flow chart that explains the movement and especially the command input processing of the above-mentioned CPU.
Figure 19:
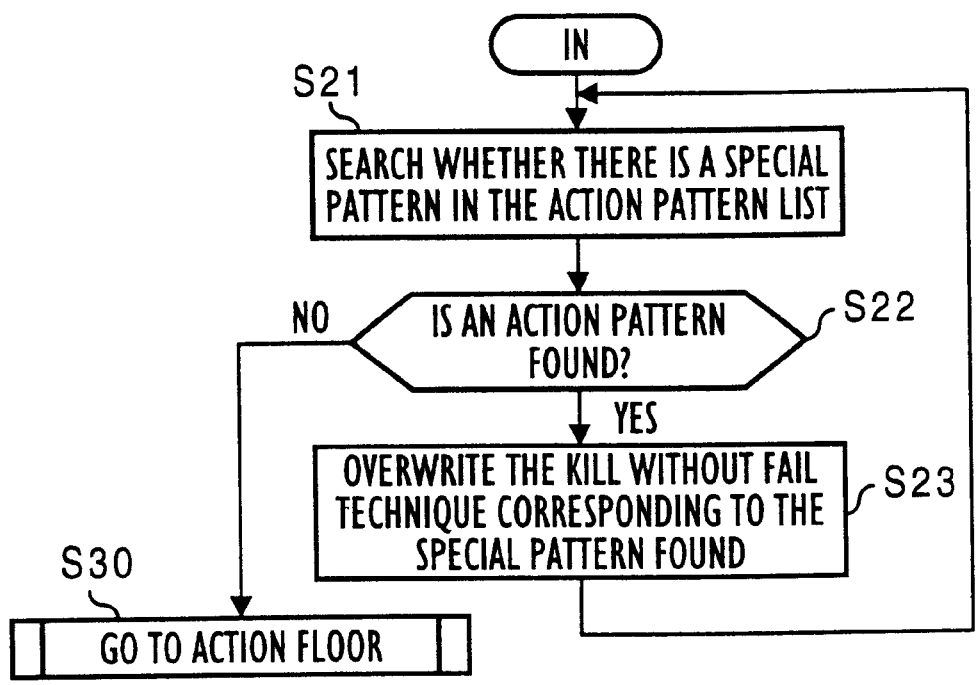
FIG. 19 is a flow chart that explains the movement of the above-mentioned CPU and especially the special pattern search flow.
Figure 20:
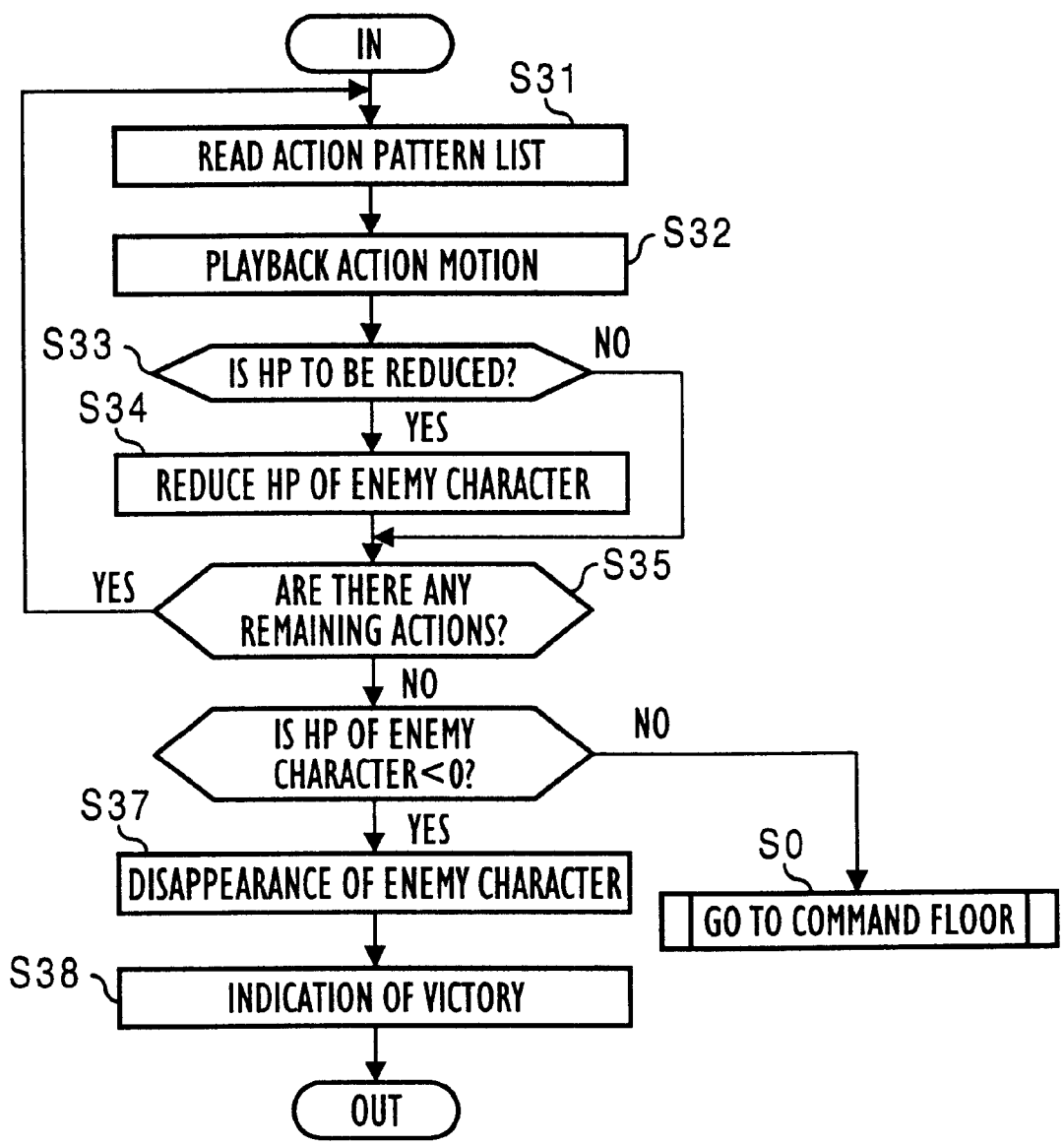
FIG. 20 is a flow chart that explains the movement of the above-mentioned CPU and especially the action flow.

FIGS. 18–20 show the flow chart of the role-playing game and based on each control and management, the CPU 31 is started. FIG. 18 shows the flow of the command at the input process, FIG. 19 shows the flow of the special pattern search processing, and FIG. 20 shows the flow of actual action processing.

At first, the input process is explained in FIG. 18. Operation part 92 sets the length of action gauge 103 shown in above-mentioned FIG. 2 in step S1 as LENGTHa. Next whether there is a key input which uses input controller 73 in step S2 or not is judged in key input judgement part 91.

When it is judged by step S2 judgement that there was a key input, proceed to step S3, key input judgement part 91 judges whether the operated key is a decision key like enter key for instance. Here, if it is a decision key, proceed to step S4, and it is judged whether if even one command is set in the action pattern list installed in RAM 33 in control system 30. On the other hand, when key input judgement part 91 judges that the input in step S3 is not a decision key, proceed to step S5.

In step S5, operation part 92 reads the length value of the action value of the input command by using the command selection part 104a, 104b, 104c and 104d of FIG. 2. And, operation part 92 sets the length value corresponding to the input command as LENGTHb in step S6, LENGTHa-LENGTHb is calculated in step S7, and set to LENGTHc.

In step S8, judgement part 97 judges whether LENGTHc is smaller than 0 or not. Here, if it is smaller than 0, return to step S2, and if it is equal or more than 0, proceed to step S9.

In step S9, operation part 92 obtains the remainder of the length of the action gauge 103, and command control part 93 sets the input command in the action pattern list in step S10.

Next, proceed to step S12 when judgement part 97 judges that the length of the remainder of action gauge 103 is less than the length value of all the commands in step S11, and command control part 93 completes the command input. Return to step S2 when judgement part 97 judges that the length of the remainder of action gauge 103 can still set commands in step S11.

In said step S4, proceed to step S12 even if it is judged that at least one command is set in the action pattern list.

Proceed to the special pattern search flow in step S20 when the command input in step S12 is completed.

Special pattern search flow is explained in FIG. 19. In step S21, special pattern search part 94 of CPU 31 searches whether there is a special pattern shown in FIG. 8 and FIG. 11, for example, in the action pattern list installed in RAM 33. Next, proceed to step S23 when it is judged that a special pattern was found by judgement part 97, graphic control part overwrites the kill without fail technique which corresponds to a special pattern 95 using the graphic generation system 40, and then return to step S21. On the other hand, advance to the action flow in step S30 when judgement part 97 judges that the special pattern search part 94 is not able to find a special pattern in step S22.

With regards to this action flow, explanation is presented while using FIG. 20. When the action pattern list is read in step S31, graphic control part 95 reproduces the action motion by using GPU 42, etc., of graphic generation system 40 in step S32.

If the attack of the enemy character hits the player character by this action motion reproduction, hit point (HP) is decreased by using operation part 92 in step S33.

Moreover, if the kill without fail technique notified the player by "NEW ARTS!!" as shown in FIG. 9 and FIG. 10, for example, hits enemy character B, hit point (HP) of the enemy character is decreased in step S34.

And, if in step S35 the command control part 93 judges that there is still a remaining action in the command order the said action pattern, return to step S31, and if it is decided that there is none, proceed to step S36.

And, if when calculation part 92 calculates hit point (HP) of the enemy character in step S36, and it becomes less than 0, the enemy character is eliminated in step S37, and the display of victory is displayed by graphic generation system 40 through graphic control part 95 in step S38.

On the other hand, return to flow of input command in step S0 shown in FIG. 18 if it is judged that hit point (HP) of the enemy character is 0 or more in step S36.

Here, about the sound generation system 50, though the explanation was omitted, at the disappearance of the enemy character in step S37 and displaying victory at the same time the sound effect is made, for example, in step S38. Moreover, at the time of action motion reproduction in step S32 or at the time of command input, or at the time of special pattern search, it is possible to have sound effects.

Figure 21:
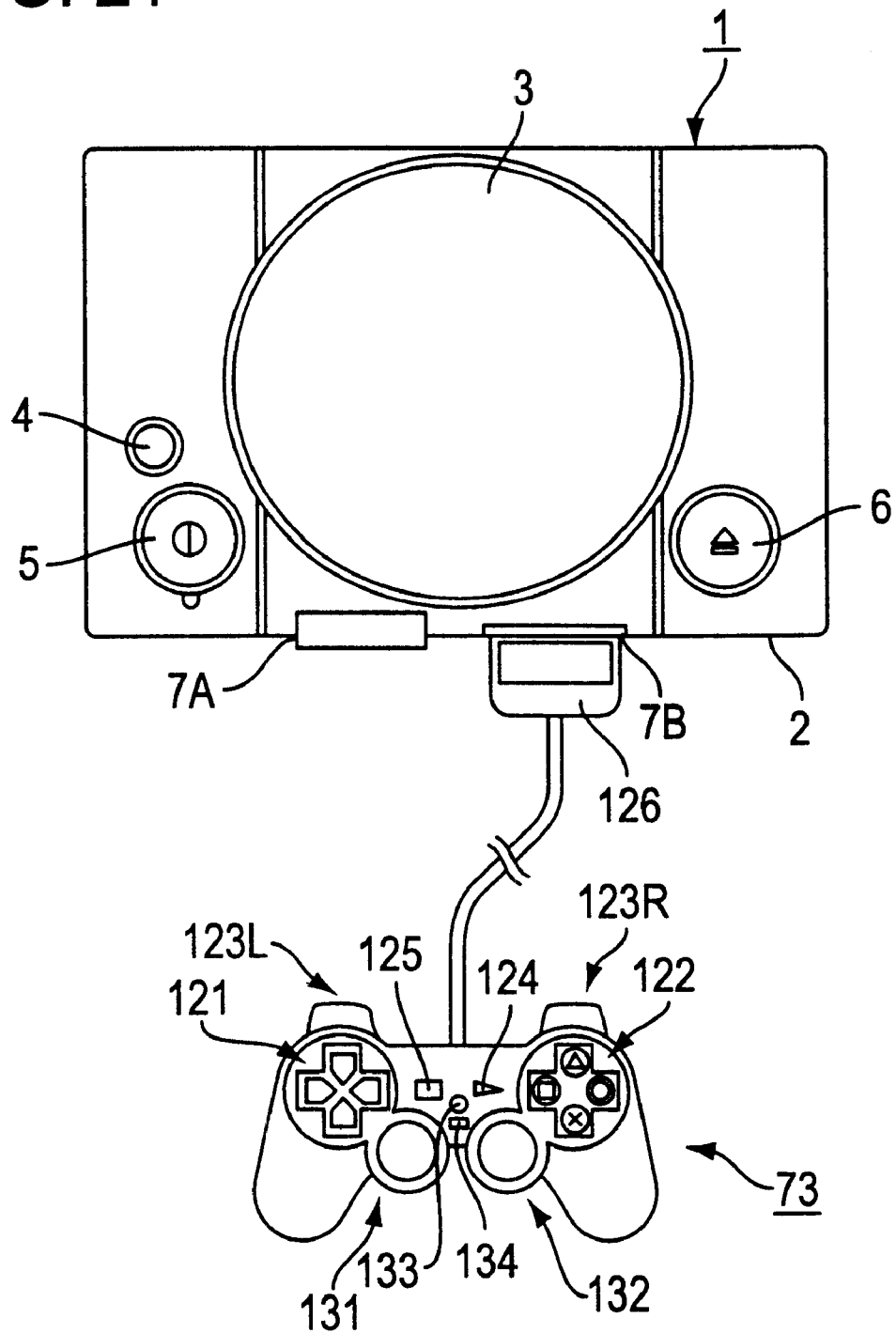
FIG. 21 is the front view of the above-mentioned video game machine.
Figure 22:
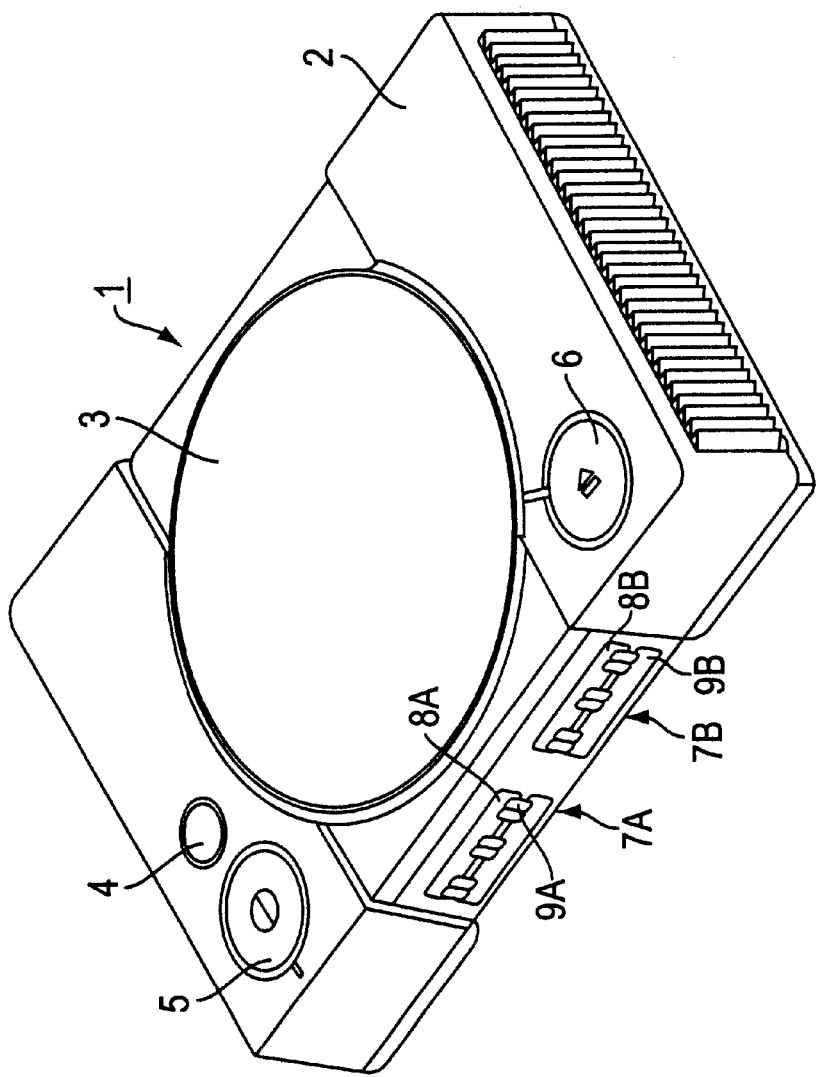
FIG. 22 is a perspective view of the exterior of the main body of the video game machine of the present invention.

The exterior of the role-playing game video game machine 1, which performs as described from FIG. 2 to FIG. 15 by having the CPU 31 operating in the above manner, is shown in FIG. 21 and FIG. 22. In FIG. 21, the front view of the connection of the main body 2 of video game machine 1 to the input controller 73 is shown, and the external perspective view of the main body 2 of video game machine 1 is shown in FIG. 22.

Main body 2 of video game machine 1 is accommodated in a roughly square enclosure and is composed of; disk installation part 3 where the optical disk such as CD-ROM which are the record medium to supply the application program such as the said role-playing games to the center part is installed, reset switch 4 to reset the game arbitrarily, power supply switch 5, and disk operation switch 6 to operate the installation of the said optical disk and two slot components 7A and 7B.

Two operation devices 73 may be connected to slot components 7A and 7B, and two users can also play a game together. Furthermore, a memory card device and a portable electronic equipment can be attached to these slot components 7A and 7B. FIG. 21 illustrates a structure installed with two slot components 7A and 7B, however, the number does not have to be limited to two systems only.

Operation device 73 contains 1st and 2nd operation components 121 and 122 respectively, L button 123L, R button 123R, start button 124, and selection button 125, and in addition, it has operation components 131 and 132 where an analog operation is possible, mode selection switch 133 which selects the operation mode of these operation parts 131 and 132 and display part 134 to display the selected operation. Furthermore, a vibration generating mechanism not shown in the figure is installed in operation device 73.

In the said execution mode, the said application program is recorded in the record medium such as optical disks, and through the installation of this record medium, the game can be played. On the other hand, it is also possible to play the above-mentioned game by taking the above-mentioned application program, for instance, through the network and storing it in a storage medium like RAM. As for the hardware component in this case, the network for instance is connected in the role-playing game device of FIG. 1 instead of application program record system 60.

Execution of consecutive movements of the character is made possible and the actions with presence can be simulated through this device.

What is claimed is:

1. A recording medium containing a program that allows a player to advance a game by manipulating a selected character displayed on a display screen through a key input according to the player's intention, wherein the said program recorded in the recording medium enables input of a plurality of commands related to actions of said selected character in an action set frame on said display screen so as to set up the actions of said selected character as a single operation, wherein said action set frame is determined and generated on said display screen in response to said plurality of commands input by said player, and wherein said recorded program is capable of recording two or more of said commands if total action points are within the permissible range of action points for said action set frame, and the total allowed action points for said action set frame and points corresponding to each of said action command type are decided in advance.

2. The recording medium as described in claim 1, wherein a program, which converts two or more of said commands in said action set frame to a special command when the arrangement of said two or more of said commands meets a predefined requirement, is recorded.

3. The recording medium as described in claim 1, wherein for action points corresponding to each of said commands, parameters other than the said commands are assigned to the selected character to give a predefined characteristic to the selected character.

4. An entertainment system where a player simulates movements of a player character in the virtual world through a manipulation of a key input, the entertainment system comprising an input device for a player command input operation, a storage medium which stores a program which enables input of a plurality of commands, in one operation step, related to actions of said selected character in an action set frame which is used to set up the actions of said player character; and control means to control movement of said player character on a display screen based on a command input through said input device and said program stored in said storage medium, wherein said action set frame is generated on said display screen in response to key input by said player and not in accordance with a predetermined sequence stored on said storage medium, and wherein said control means record two or more of said action commands, and wherein an action point corresponding to each action command and the total allowed action points in a said action set frame is decided beforehand and said action command points are within the total action points allowed within said action set frame.

5. A recording medium containing a program that allows a player to advance a game by manipulating a selected character displayed on a display screen through a key input according to the player's intention, wherein said program recorded in the recording medium enables input of at least one command related to an action of said selected character in an action set frame on said display screen, said command having a corresponding action point value, and wherein said program is capable of recording two or more of said commands in said action set frame as a single operation if total action points are within a permissible range of action points for said action set frame.

6. The recording medium as described in claim 5, wherein a program, which converts two or more of said commands in said action set frame to a special command when said two or more of said commands are arranged in a predefined order, is recorded.

7. The recording medium as described in claim 5, wherein for action points corresponding to each of said commands, parameters other than the said commands are assigned to the selected character to give a predefined characteristic to the selected character.

8. The recording medium as described in claim 5, wherein said permissible range is determined beforehand.

* * * * *